(12) United States Patent
Onishi et al.

(10) Patent No.: US 7,586,288 B2
(45) Date of Patent: Sep. 8, 2009

(54) MANUFACTURING METHOD OF SECONDARY BATTERY, RESTRAINING JIG FOR SECONDARY BATTERY, CHARGING/DISCHARGING DEVICE FOR SECONDARY BATTERY, AND CHARGING DEVICE FOR SECONDARY BATTERY

(75) Inventors: Masato Onishi, Toyohashi (JP);
Yasufumi Tanaka, Toyohashi (JP);
Kojiro Ito, Toyohashi (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 369 days.

(21) Appl. No.: 11/371,008

(22) Filed: Mar. 9, 2006

(65) Prior Publication Data
US 2006/0200972 A1      Sep. 14, 2006

(30) Foreign Application Priority Data
Mar. 9, 2005    (JP)   ............................. 2005-064847

(51) Int. Cl.
*H02J 7/00*    (2006.01)
(52) U.S. Cl. ........................ 320/107; 429/163; 429/200; 361/517; 361/535

(58) Field of Classification Search .................. 320/107; 429/163, 200; 361/535, 517
See application file for complete search history.

(56) References Cited

U.S. PATENT DOCUMENTS 6,451,474 B1 * 9/2002 Kozu et al. .................. 429/100

FOREIGN PATENT DOCUMENTS

| JP | 07-226234 | 8/1995 |
| JP | 2001-291526 | * 10/2001 |

* cited by examiner

*Primary Examiner*—Adolf Berhane
*Assistant Examiner*—Yalkew Fantu
(74) *Attorney, Agent, or Firm*—Finnegan, Henderson, Farabow, Garrett & Dunner, LLP

(57) ABSTRACT

A manufacturing method of a secondary battery according to the present invention includes a charging/discharging process wherein the secondary battery is arranged to a restraining jig, that restricts an expansion caused on the battery case with respect to at least a part of the battery case and that is configured to be removable from a charging/discharging device with the secondary battery arranged thereto regardless of the magnitude of the internal pressure in the secondary battery; a charging/discharging is performed to the secondary battery with the restraining jig mounted to the charging/discharging device; and after the completion of the charging/discharging, the restraining jig is removed from the charging/discharging device with the secondary battery arranged to the restraining jig.

19 Claims, 11 Drawing Sheets

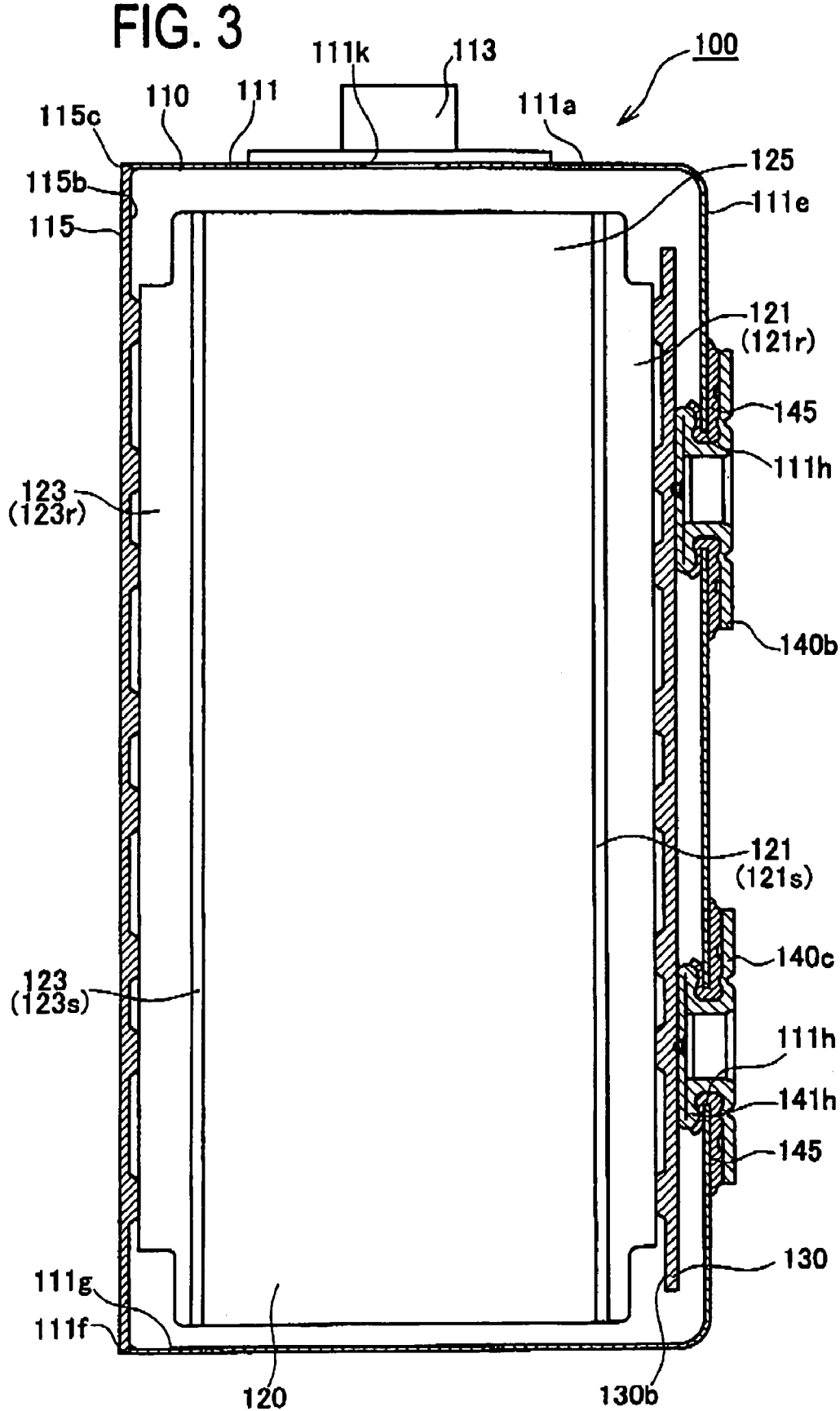

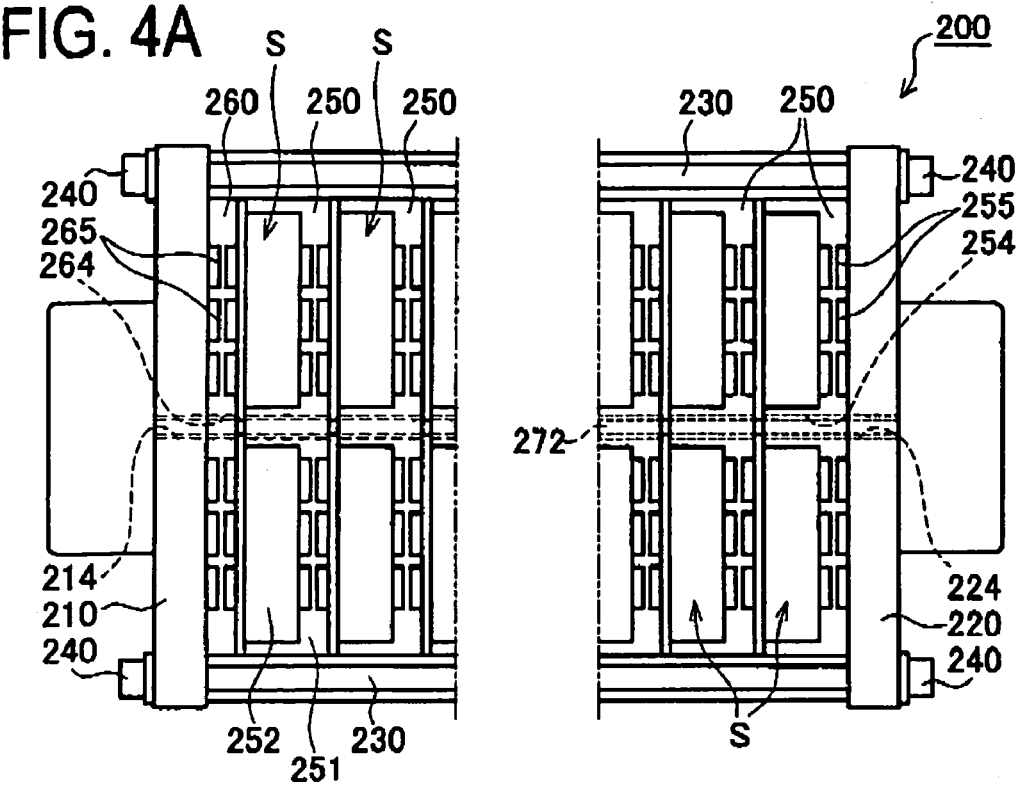
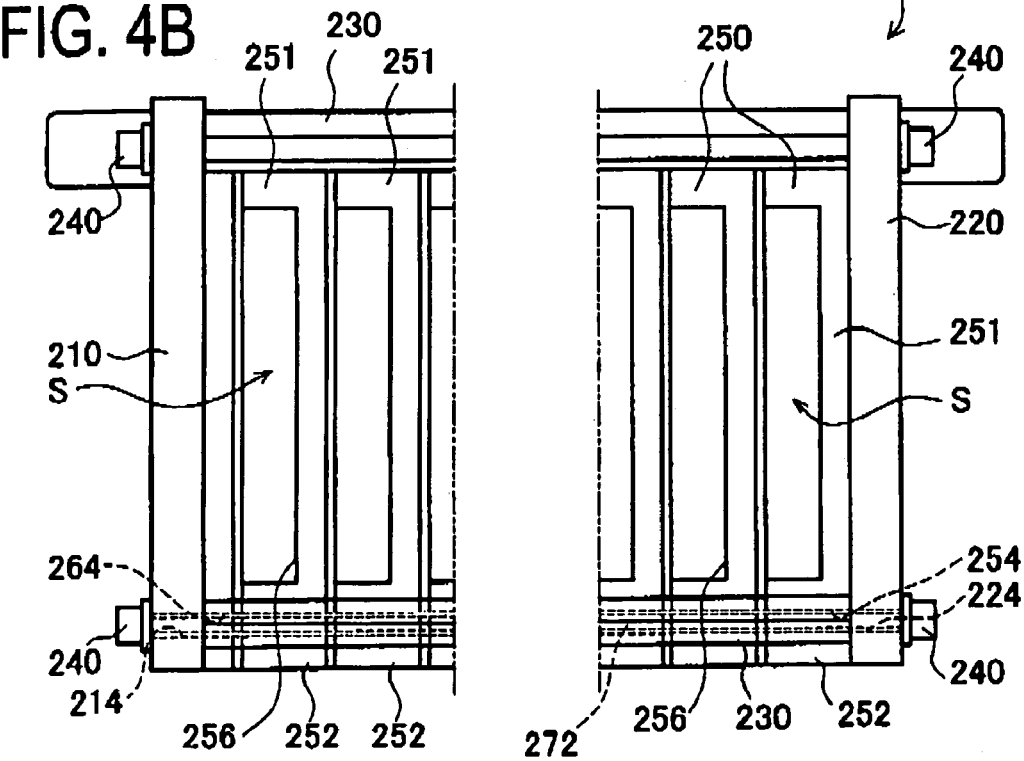

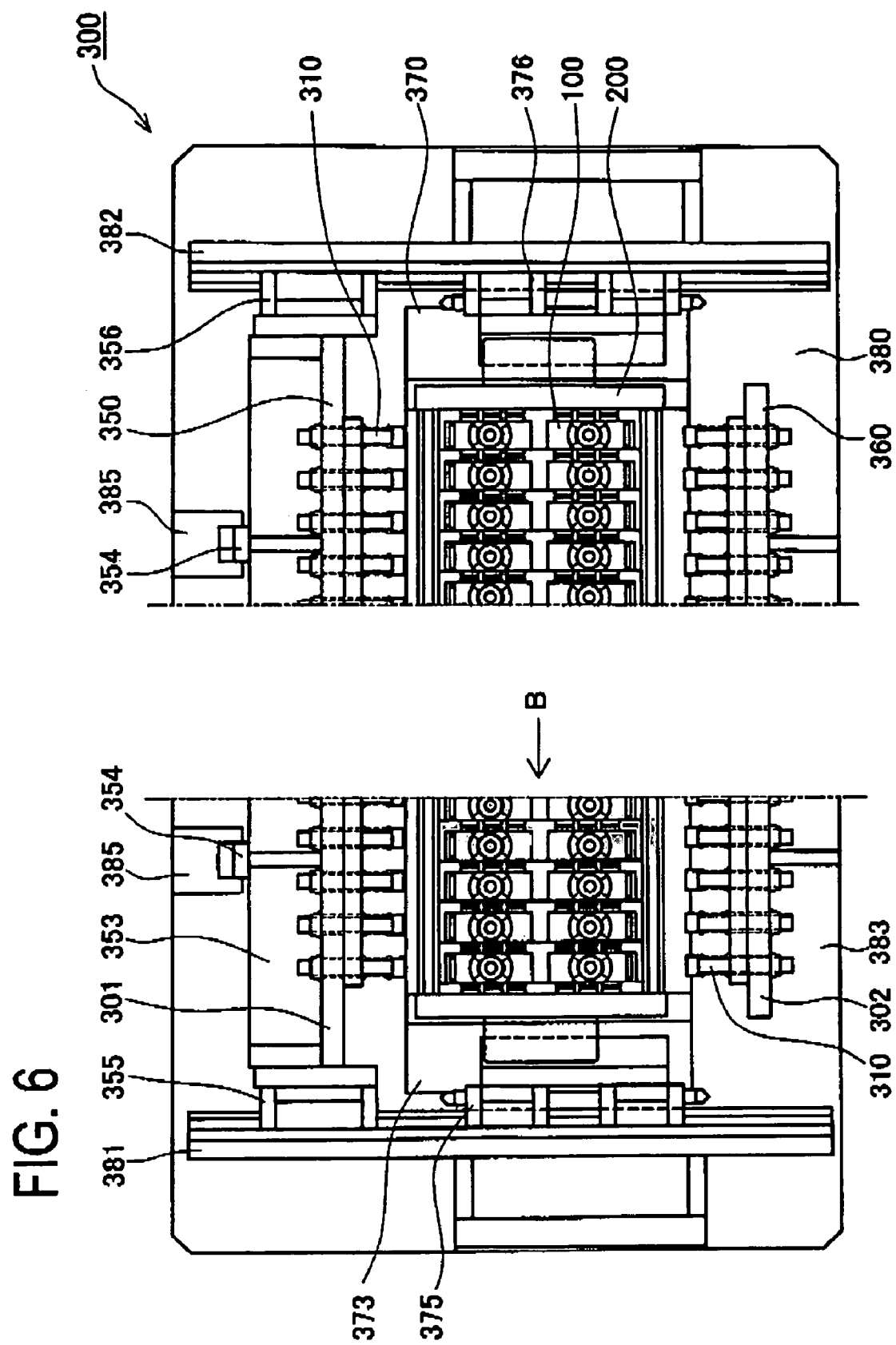

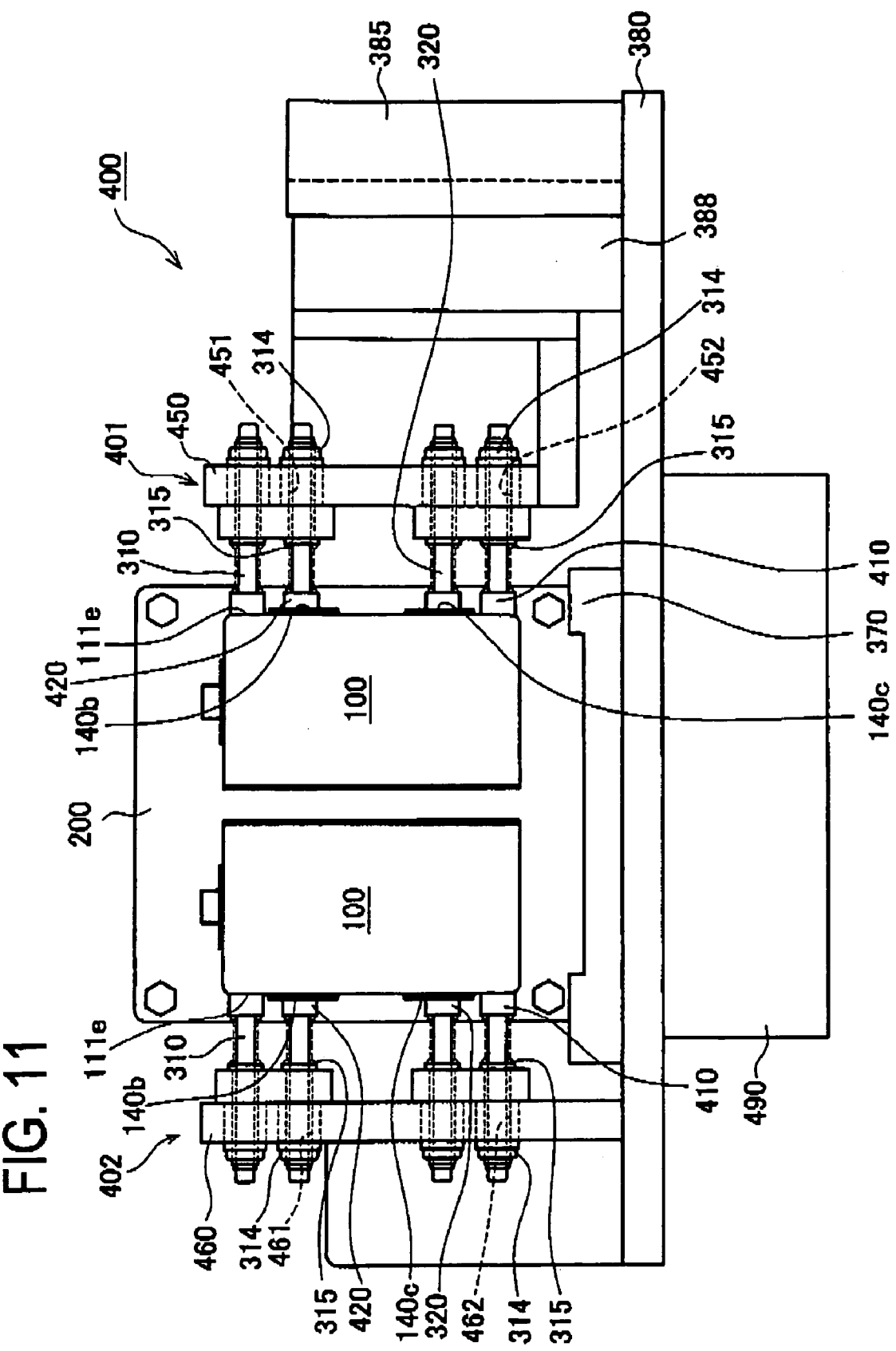

MANUFACTURING METHOD OF SECONDARY BATTERY, RESTRAINING JIG FOR SECONDARY BATTERY, CHARGING/DISCHARGING DEVICE FOR SECONDARY BATTERY, AND CHARGING DEVICE FOR SECONDARY BATTERY

BACKGROUND OF THE INVENTION

1. Field of the Invention

The present invention relates to a manufacturing method of a secondary battery, a restraining jig for a secondary battery, a charging/discharging device for a secondary battery, and a charging device for a secondary battery.

2. Description of Related Arts

Recently, a demand for a secondary battery such as nickel hydride battery, lithium ion battery, or the like has been increased with the development of mobile equipment such as cellular phone, portable personal computer, or the like or practicalization of pure electric vehicle or hybrid electric vehicle. During the manufacturing process of a secondary battery, each component is assembled, and then, a battery is activated by performing a charging/discharging to necessarily adjust the characteristic of each battery to a predetermined characteristic. Various types have been proposed for a charging/discharging method after the assembly of the battery and a charging/discharging device used for this (e.g., see Japanese Unexamined Patent Application Publication No. 7-226234 (1995), Japanese Unexamined Patent Application Publication No. 2001-291526).

Japanese Unexamined Patent Application Publication No. 7-226234(1995) discloses a charging/discharging device for a cylindrical secondary battery wherein electrodes of the battery and electrode terminals of the charging/discharging device can surely be connected. However, since the internal pressure in the secondary battery increases with the charging, the battery can (battery case) tends to be expanded. In the charging/discharging device disclosed in the publication '234, the battery is repeatedly expanded due to the repeated charging/discharging for the battery, so that stress is repeatedly applied on the battery can (battery case). Therefore, there is a possibility of distortion or deformation produced on the battery can (battery case). Further, the electrolytic solution might be leaked due to the breakdown at the joint section (welding section) of the battery can (battery case).

On the other hand, Japanese Unexamined Patent Application Publication No. 2001-291526 discloses that an expansion restricting member is used, whereby a secondary battery is charged/discharged while restricting the expansion of a battery can (battery case) involved with the charging. Accordingly, it discloses that the deformation of the battery can (battery case) caused by the expansion can be prevented.

However, in Japanese Unexamined Patent Application Publication No. 2001-291526, the expansion restricting member is arranged between each battery after each battery is mounted to a charging jig. Further, in order to transfer the battery, which has been subject to the charging/discharging, to the next process, the expansion restricting member should be removed after the expansion of the battery case is stopped, and further, each battery should be removed from the charging jig. As described above, the technique in the publication '526 brings a troublesome and time-consuming operation before the start of the charging/discharging and after the end thereof (including the waiting time until the expansion of the battery case is stopped), thereby entailing a problem of deteriorating productivity of the secondary battery.

SUMMARY OF THE INVENTION

The present invention has been made in view of the above circumstances and has an object to overcome the above problems and to provide a manufacturing method of a secondary battery, a restraining jig for a secondary battery, a charging/discharging device for a secondary battery, and a charging device for a secondary battery that can swiftly perform a charging/discharging process and provide satisfactory productivity of a secondary battery.

To achieve the purpose of the invention, there is provided a manufacturing method of a secondary battery provided with a power generating element and a battery case accommodating the power generating element, comprising the steps of: arranging the secondary battery to a restraining jig, that restricts an expansion caused on the battery case with respect to at least a part of the battery case and that is configured to be removable from a processing device that performs either one of charging process and discharging process to the secondary battery with the secondary battery arranged to the restraining jig regardless of the magnitude of the internal pressure in the secondary battery, and performing at least either one of the charging process and discharging process to the secondary battery with the restraining jig mounted to the processing device; and removing the restraining jig from the processing device with the secondary battery arranged thereto after the completion of said process.

In the manufacturing method of a secondary battery according to the present invention, a secondary battery is arranged to a restraining jig, and at least either one of charging process and discharging process is performed to the secondary battery with the restraining jig mounted to a processing device. According to this configuration, at least either one of the charging process and discharging process can be performed to the secondary battery while restricting the expansion of a battery case, whereby distortion of the battery case or leakage of electrolytic solution can be prevented.

Further, in the manufacturing method according to the present invention, the restraining jig can be removed from a processing device with the secondary battery arranged thereto, after at least either one of charging process and discharging process is completed. Moreover, the restraining jig is configured to be removable from the processing device with the secondary battery arranged to the restraining jig, regardless of the magnitude of the internal pressure in the secondary batter. Accordingly, the secondary battery can be removed from the processing device at any time as is left arranged to the restraining jig, after at least either one of charging process and discharging process is completed.

Consequently, even if the internal pressure in the secondary battery increases after at least either one of charging process and discharging process is completed, for example, the secondary battery can be removed from the processing device as is left arranged to the restraining jig without waiting for the reduction in the internal pressure in the secondary battery. Accordingly, the processing time can be shortened, compared to the technique wherein the secondary battery is removed from the processing device after the internal pressure in the secondary battery falls (after the secondary battery expanded is returned to an original shape) after the completion of the above-mentioned process. Moreover, the above-mentioned process can be performed to another (new) secondary battery immediately after the above-mentioned process is completed, whereby the process can swiftly be performed, thereby being capable of enhancing productivity of the secondary battery.

It should be noted that the power generating element is arranged in the battery case for achieving a function of a battery, and includes, for example, electrodes, separator, electrolytic solution, and the like.

Further, the manufacturing method according to the present invention can be applied not only to the manufacture of a secondary battery provided with a metallic battery case but also to the manufacture of a secondary battery provided with a resinous battery case.

If a restraining jig having a configuration in which plural secondary batteries can be arranged thereto, plural secondary batteries arranged to the restraining jig can be removed all together from the processing device, different from the conventional manufacturing method in which a secondary battery is individually removed from the processing device. Therefore, the process can more swiftly be performed, thus preferable.

Examples of the processes include an initial charging process for performing a charging to a non-charged secondary battery, a charging/discharging process for performing a charging/discharging to the secondary batter, a charging process for performing a charging to the secondary batter, a discharging process for performing a discharging to the secondary battery, and the like.

Examples of the processing device include a charging device for performing a charging to a secondary battery, a discharging device for performing a discharging, a charging/discharging device for performing a charging/discharging, and the like.

In the manufacturing method of a secondary battery as described above, the process is preferably such that the restraining jig is removed from the processing device with the secondary battery arranged thereto without waiting for the reduction in the internal pressure in the secondary battery after at least either one of the charging process and discharging process is completed.

The processing time can be shortened, compared to the technique wherein the secondary battery is removed from the processing device after the internal pressure in the secondary battery falls (after the secondary battery expanded is returned to an original shape) after the completion of the above-mentioned process. Moreover, the above-mentioned process can be performed to another (new) secondary battery immediately after the above-mentioned process is completed, whereby the process can swiftly be performed, thereby being capable of enhancing productivity of the secondary battery.

According to another aspect of the invention, there is provided a manufacturing method of a secondary battery provided with a power generating element and a battery case accommodating the power generating element, comprising the steps of: arranging the secondary battery to a restraining jig, that restricts an expansion caused on the battery case with respect to at least a part of the battery case and that is configured to be removable from a charging/discharging device with the secondary battery arranged to the restraining jig regardless of the magnitude of the internal pressure in the secondary battery, and performs the charging/discharging process to the secondary battery with the restraining jig mounted to the charging/discharging device; and removing the restraining jig from the charging/discharging device with the secondary battery arranged thereto after the completion of the charging/discharging process.

In the manufacturing method of a secondary battery according to the present invention, a secondary battery is arranged to a restraining jig, and charging/discharging process is performed in the charging/discharging process to the secondary battery with the restraining jig mounted to a charging/discharging device. According to this configuration, the charging/discharging process can be performed to the secondary battery while restricting the expansion of a battery case, whereby distortion of the battery case or leakage of electrolytic solution can be prevented.

Further, in the manufacturing method according to the present invention, the restraining jig can be removed from a charging/discharging device with the secondary battery arranged to the restraining jig, after the charging/discharging process is completed. Moreover, the restraining jig is configured to be removable from the charging/discharging device with the secondary battery attached to the restraining jig, regardless of the magnitude of the internal pressure in the secondary batter. Accordingly, the secondary battery can be removed from the charging/discharging device at any time as is left arranged to the restraining jig, after the charging/discharging process is completed.

Consequently, even if the internal pressure in the secondary battery increases after the charging/discharging process is completed, for example, the secondary battery can be removed from the charging/discharging device as is left arranged to the restraining jig without waiting for the reduction in the internal pressure in the secondary battery. Accordingly, the processing time can be shortened, compared to the technique wherein the secondary battery is removed from the charging/discharging device after the internal pressure in the secondary battery falls (after the secondary battery expanded is returned to an original shape) after the completion of the charging/discharging process. Moreover, the charging/discharging process can be performed to another (new) secondary battery immediately after the charging/discharging process is completed, whereby the charging/discharging process can swiftly be performed, thereby being capable of enhancing productivity of the secondary battery.

It should be noted that the power generating element is arranged in the battery case for achieving a function of a battery, and includes, for example, electrodes, separator, electrolytic solution, and the like.

Further, the manufacturing method according to the present invention can be applied not only to the manufacture of a secondary battery provided with a metallic battery case but also to the manufacture of a secondary battery provided with a resinous battery case.

If a restraining jig having a configuration in which plural secondary batteries can be arranged thereto, plural secondary batteries arranged to the restraining jig can be removed all together from the charging/discharging device, different from the conventional manufacturing method in which a secondary battery is individually removed from the charging/discharging device. Therefore, the charging/discharging process can more swiftly be performed, thus preferable.

In the foregoing manufacturing method of a secondary battery, it is preferable that the battery case has a shape of box-like rectangular parallelepiped, and the restraining jig restricts the expansion caused on the battery case with respect to at least two opposing wall portions having the greatest external surface area, among six wall portions constituting the battery case.

In the manufacturing method according to the present invention, the charging/discharging is performed to the secondary battery as the expansion caused on the battery case is restricted with respect to at least two opposing wall portions having the greatest external surface area, among six wall portions constituting the battery case. Specifically, the charging/discharging is performed to the secondary battery as its expansion is restricted with respect to at least the wall portions that are most likely to be expanded in the battery case.

Accordingly, the expansion of the battery case involved with the charging/discharging can appropriately be restrained, thereby being capable of appropriately preventing the distortion of the battery case and leakage of the electrolytic solution.

Preferably, the above mentioned manufacturing method of a secondary battery further comprises: an initial charging process for performing an initial charging to a non-charged secondary battery before the charging/discharging process, wherein the restraining jig is configured to be removable from the charging device with the secondary battery arranged thereto regardless of the magnitude of the internal pressure in the secondary battery, and during the initial charging process, the secondary battery is arranged to the restraining jig and the initial charging is performed to the secondary battery with the restraining jig mounted to the charging device, and this restraining jig is removed from the charging device with the secondary battery arranged thereto after the completion of the initial charging, and during the charging/discharging process, the restraining jig removed from the charging device is mounted to the charging/discharging device with the secondary battery arranged thereto for performing the charging/discharging process.

In the manufacturing method of a secondary battery according to the present invention, a secondary battery is arranged to a restraining jig, and initial charging process is performed in the initial charging process to the secondary battery with the restraining jig mounted to a charging device. According to this configuration, the initial charging process can be performed to the secondary battery while restricting the expansion of a battery case, whereby distortion of the battery case or leakage of electrolytic solution can be prevented.

Further, in the manufacturing method according to the present invention, the restraining jig can be removed from the charging device with the secondary battery arranged to the restraining jig, after the initial charging process is completed. Moreover, the restraining jig is configured to be removable from the charging device with the secondary battery attached to the restraining jig, regardless of the magnitude of the internal pressure in the secondary battery. Accordingly, the secondary battery can be removed from the charging device at any time as is left arranged to the restraining jig, after the initial charging process is completed.

Consequently, even if the internal pressure in the secondary battery increases after the initial charging process is completed, for example, the secondary battery can be removed from the charging device as is left arranged to the restraining jig without waiting for the reduction in the internal pressure in the secondary battery. Accordingly, the processing time can be shortened, compared to the technique wherein the secondary battery is removed from the charging device after the internal pressure in the secondary battery falls (after the secondary battery expanded is returned to an original shape) after the completion of the initial charging process. Moreover, the initial charging process can be performed to another (new) secondary battery immediately after the initial charging process is completed, whereby not only the charging/discharging process but also the initial charging process can swiftly be performed, thereby being capable of enhancing productivity of the secondary battery.

Further, in the charging/discharging process, the secondary battery is arranged to the restraining jig removed from the charging device, and this restraining jig is mounted to the charging/discharging device to perform the charging/discharging. Accordingly, compared to a technique for individually mounting the secondary battery, that is individually removed from the charging device to the charging/discharging device, a labor for transferring the secondary battery is saved. Therefore, the secondary battery can be swiftly mounted to the charging/discharging device for performing the charging/discharging. Further, the restraining jig used in the initial charging process is also used in the charging/discharging process, whereby cost can be reduced compared to the case of using a restraining jig dedicated for each process.

If a restraining jig having a configuration in which plural secondary batteries can be arranged thereto, plural secondary batteries arranged to the restraining jig can be removed all together from the charging device. Further, the plural secondary batteries arranged to the restraining jig can be mounted all together to the charging/discharging device. Therefore, the initial charging process and charging/discharging process can more swiftly be performed, thus preferable.

Preferably, the above mentioned manufacturing method of a secondary battery further comprises: an aging process wherein the secondary battery is rested under high-temperature atmosphere for a predetermined period after the charging/discharging process with the secondary battery arranged to the restraining jig.

The internal pressure of the secondary battery rises even in the aging process in which the temperature of the secondary battery rises, so that there is a possibility of expansion of the battery case. As a countermeasure of this, the aging is performed during the aging process according to the manufacturing method of a secondary battery with the secondary batteries arranged to the restraining jig after the charging/discharging process. Accordingly, the expansion of the battery case can be restrained even in the aging process.

Further, it is unnecessary to remove the secondary batteries from the charging/discharging device and to transfer them to an aging device, whereby the aging process can swiftly be performed. Moreover, the restraining jig used in the charging/discharging process is also used in the aging process, so that cost can be reduced compared to the case in which a jig dedicated for each process is used.

Furthermore, in the above mentioned manufacturing method of a secondary battery, preferably, the charging/discharging device has a positive electrode terminal connected to the positive electrode of the secondary battery and a negative electrode terminal connected to the negative electrode of the secondary battery, wherein, in the charging/discharging process, the positive electrode terminal is pressed against the positive electrode of the secondary battery for establishing a connection while the negative electrode terminal is pressed against the negative electrode of the secondary battery for establishing a connection, and then the charging/discharging is performed.

In the manufacturing method according to the present invention, positive electrode terminal and negative electrode terminal of the charging/discharging device are pressed against the positive electrode and negative electrode of the secondary battery respectively for establishing a connection in the charging/discharging process. With this configuration, the positive electrode terminal and the negative electrode terminal can follow the displacement of the positive electrode and negative electrode, even in case where the positive electrode and negative electrode of the secondary battery are displaced due to the expansion of the battery case. Accordingly, poor connection between the electrodes (positive electrode and negative electrode) of the secondary battery and the electrode terminals (positive electrode terminal and negative electrode terminal) of the charging/discharging device can be prevented, whereby the charging/discharging for the secondary battery can appropriately be performed.

Examples of the type of the positive electrode terminal and negative electrode terminal that press the positive electrode and negative electrode include the one for elastically pressing the positive electrode and negative electrode by utilizing elastic force of a coil spring.

In case where the charging/discharging is simultaneously performed to plural secondary batteries, it is preferable that each of the positive electrode terminals is connected to the positive electrode of each of the secondary batteries and each of the negative electrode terminals is connected to the negative electrode of each of the secondary batteries. This is because the charging/discharging can surely be performed to each secondary battery by connecting the positive electrode to the positive electrode terminal and the negative electrode to the negative electrode terminal for each secondary battery.

According to another aspect of the invention, there is provided a restraining jig that restricts an expansion caused on the battery case with respect to at least a part of the battery case with respect to a secondary battery provided with a power generating element and a battery case accommodating the power generating element, wherein the restraining jig is configured to be removable from a first processing device, that performs at least either one of a charging process and discharging process to the secondary battery, with the secondary battery arranged to the restraining jig regardless of the magnitude of the internal pressure in the secondary battery.

The restraining jig according to the present invention restricts the expansion caused on the battery case of the secondary battery arranged thereto with respect to at least a part of the battery case. Therefore, the expansion of the battery case can be restrained by performing at least either one of the charging process and discharging process to the secondary battery with the state wherein the secondary battery is arranged to the restraining jig of the present invention and this restraining jig is mounted to a first processing device. Accordingly, the distortion of the battery case and the leakage of the electrolytic solution can be prevented by performing the above-mentioned process with the use of the restraining jig of the present invention.

The restraining jig according to the present invention is configured to be removable from the first processing device with the secondary battery arranged thereto, regardless of the magnitude of the internal pressure in the secondary battery. Accordingly, the restraining jig to which the secondary battery is arranged can be removed from the first processing device at any time after the completion of either one of the charging process and the discharging process.

Consequently, even if the internal pressure in the secondary battery increases after the above-mentioned process is performed to the secondary battery, for example, the secondary battery can be removed from the first processing device as is left arranged to the restraining jig without waiting for the reduction in the internal pressure in the secondary battery. Accordingly, the processing time can be shortened, compared to the technique wherein the secondary battery is removed from the first processing device after the internal pressure in the secondary battery falls (after the secondary battery expanded is returned to an original shape) after the completion of the above-mentioned process. Moreover, the charging or discharging process can be performed to another (new) secondary battery immediately after the above-mentioned process is completed, whereby the above-mentioned process can swiftly be performed, thereby being capable of enhancing productivity of the secondary battery.

It should be noted that the restraining jig according to the present invention can be used for not only the secondary battery provided with a metallic battery case but also a secondary battery provided with a resinous battery case.

If the restraining jig according to the present invention has a configuration in which plural secondary batteries can be arranged thereto, plural secondary batteries arranged to the restraining jig can be removed all together from the first processing device. Therefore, the process can more swiftly be performed, compared to the case where plural secondary batteries are individually removed from the first processing device, thus preferable.

Examples of the first processing device include a charging device for performing a charging to the secondary battery, a discharging device for performing a discharging and charging/discharging device for performing a charging/discharging.

Further, it is preferable that the above-mentioned restraining jig can be attached to or removed from the first processing device with the secondary battery arranged thereto.

A series of processes such as mounting the secondary battery to the first processing device, performing the process, and removing the secondary battery from the first processing device can be carried out with the secondary battery arranged to the restraining jig, with the result that the processes applied to the secondary battery can swiftly be performed.

If the restraining jig according to the present invention has a configuration in which plural secondary batteries can be arranged thereto, plural secondary batteries arranged to the restraining jig can be mounted or removed all together to or from the first processing device. Therefore, the processes that are to be performed to the secondary battery can more swiftly be performed, compared to the case where plural secondary batteries are individually mounted to or removed from the first processing device, thus preferable.

Furthermore, the above mentioned restraining jig is preferably configured also to be removable from a second processing device, that performs at least either one of a charging process and discharging process to the secondary battery, with the secondary battery arranged to the restraining jig regardless of the magnitude of the internal pressure in the secondary battery.

The restraining jig according to the present invention is configured to be removable from the second processing device with the secondary battery arranged thereto, regardless of the magnitude of the internal pressure in the secondary battery. Accordingly, the restraining jig to which the secondary battery is arranged can be removed from the second processing device at any time after the completion of either one of the charging process and the discharging process.

Consequently, even if the internal pressure in the secondary battery increases after the above-mentioned process is performed to the secondary battery, for example, the secondary battery can be removed from the second processing device as is left arranged to the restraining jig without waiting for the reduction in the internal pressure in the secondary battery. Accordingly, the processing time can be shortened, compared to the technique wherein the secondary battery is removed from the second processing device after the internal pressure in the secondary battery falls (after the secondary battery expanded is returned to an original shape) after the completion of the above-mentioned process. Moreover, another (new) process for the secondary battery can be performed immediately after the above-mentioned process is completed.

Accordingly, not only the process using the first processing device but also the process using the second processing device can swiftly be performed with the use of the restraining jig of the present invention, thereby being capable of enhancing productivity of the secondary battery. Further, the restraining jig of the present invention can be used not only for the first processing device but also for the second processing device, with the result that cost can be reduced compared to the case of using a dedicated restraining jig for each device.

If the restraining jig according to the present invention has a configuration in which plural secondary batteries can be arranged thereto, plural secondary batteries arranged to the restraining jig can be removed all together from the second processing device. Therefore, the process applied to the secondary battery can more swiftly be performed, compared to the case where plural secondary batteries are individually removed from the second processing device, thus preferable.

Examples of the second processing device include a charging device for performing a charging to the secondary battery, a discharging device for performing a discharging and charging/discharging device for performing a charging/discharging.

Further, it is preferable that the above-mentioned restraining jig can be attached to or removed from the second processing device with the secondary battery arranged thereto.

A series of processes such as mounting the secondary battery to the second processing device, performing the process, and removing the secondary battery from the second processing device can be carried out with the secondary battery arranged to the restraining jig, with the result that the processes applied to the secondary battery can swiftly be performed.

If the restraining jig according to the present invention has a configuration in which plural secondary batteries can be arranged thereto, plural secondary batteries arranged to the restraining jig can be mounted or removed all together to or from the second processing device. Therefore, the processes that are to be applied to the secondary battery can more swiftly be performed, compared to the case where plural secondary batteries are individually mounted to or removed from the second processing device, thus preferable.

According to another aspect of the invention, furthermore, there is provided a charging/discharging device that performs a charging/discharging to a secondary battery provided with a power generating element and a battery case accommodating the power generating element, wherein the secondary battery is arranged to a restraining jig that restricts an expansion caused on a battery case with respect to at least a part of the battery case, and the charging/discharging is performed to the secondary battery with this restraining jig mounted to the charging/discharging device, wherein the restraining jig is configured to be removable from the charging/discharging device with the secondary battery arranged to the restraining jig regardless of the magnitude of the internal pressure in the secondary battery.

The charging/discharging device for the secondary battery according to the present invention is configured such that, after the charging/discharging is performed to the secondary battery, the restraining jig can be removed from the charging/discharging device with the secondary battery arranged thereto, regardless of the magnitude of the internal pressure in the secondary battery. Accordingly, the secondary battery can be removed from the charging/discharging device at any time as is left arranged to the restraining jig after the completion of the charging/discharging process.

Consequently, even if the internal pressure in the secondary battery increases after the charging/discharging process is performed to the secondary battery, for example, the secondary battery can be removed from the charging/discharging device as is left arranged to the restraining jig without waiting for the reduction in the internal pressure in the secondary battery. Accordingly, the processing time taken for the charging/discharging process can be shortened by performing the charging/discharging with the use of the charging/discharging device according to the present invention. Moreover, the charging/discharging can be performed to another (new) secondary battery immediately after the charging/discharging process is completed, whereby the charging/discharging (charging/discharging process) of the secondary battery can swiftly be performed to thereby enhance productivity of the secondary battery.

Further, it is preferable that the above-mentioned charging/discharging device is configured such that the restraining jig can be attached to or removed from the charging/discharging device with the secondary battery arranged to the restraining jig.

A series of charging/discharging process such as mounting the secondary battery to the charging/discharging device, performing the process, and removing the secondary battery from the charging/discharging device can be carried out with the secondary battery arranged to the restraining jig, with the result that the charging/discharging (charging/discharging process) for the secondary battery can swiftly be performed.

Furthermore, the above charging/discharging device for a secondary battery preferably comprises: a positive electrode terminal to which a positive electrode of the secondary battery is connected under pressure; and a negative electrode terminal to which a negative electrode of the secondary battery is connected under pressure.

In the charging/discharging device of the secondary battery according to the present invention, the positive electrode and negative electrode of the secondary battery are pressed against positive electrode terminal and negative electrode terminal respectively for establishing a connection. With this configuration, the positive electrode terminal and the negative electrode terminal can follow the displacement of the positive electrode and negative electrode, even in case where the positive electrode and negative electrode of the secondary battery are displaced due to the expansion of the battery case. Accordingly, poor connection between the positive electrode and the positive electrode terminal and the negative electrode and the negative electrode terminal can be prevented, whereby the charging/discharging for the secondary battery can appropriately be performed.

Examples of the type of the positive electrode terminal and negative electrode terminal that press the positive electrode and negative electrode include the one for elastically pressing the positive electrode and negative electrode by utilizing elastic force of a coil spring.

In case where the charging/discharging is simultaneously performed to plural secondary batteries, it is preferable that each of the positive electrode terminals is connected to the positive electrode of each of the secondary batteries and each of the negative electrode terminals is connected to the negative electrode of each of the secondary batteries. This is because the charging/discharging can surely be performed to each secondary battery by connecting the positive electrode with the positive electrode terminal and the negative electrode with the negative electrode terminal for each secondary battery.

Furthermore, in the above mentioned charging/discharging device for a secondary battery, preferably, the restraining jig is configured to be removable from the charging device with the secondary battery arranged thereto regardless of the magnitude of the internal pressure in the secondary battery; and the charging/discharging device is configured such that this restraining jig can be attached to or removed from the charging/discharging device regardless of the magnitude of the internal pressure in the secondary battery with the secondary battery arranged to the restraining jig.

The charging/discharging device of the secondary battery of the present invention is configured such that the restraining jig can be attached to or removed from the charging/discharging device with the secondary battery arranged thereto, regardless of the magnitude of the internal pressure in the secondary battery. Further, this restraining jig is configured to be removable from the charging device with the secondary battery arranged thereto, regardless of the magnitude of the internal pressure in the secondary battery.

Accordingly, in the charging/discharging device of the present invention, the charging/discharging can be performed to the secondary battery with the use of the restraining jig common to the charging device, thereby being capable of reducing cost for a manufacturing facility of the secondary battery, compared to the case of using a restraining jig dedicated for each device. Moreover, by using the charging/discharging device of the present invention, after the completion of charging (e.g., initial charging), the restraining jig can be mounted to the charging/discharging device with the secondary battery arranged thereto for performing the charging/discharging to the secondary battery, resulting in that the charging/discharging can swiftly be performed.

Further, according to another aspect of the invention, there is provided a charging device that performs a charging to a secondary battery provided with a power generating element and a battery case accommodating the power generating element, wherein the secondary battery is arranged to a restraining jig that restricts an expansion caused on the battery case with respect to at least a part of the battery case, and the charging is performed to the secondary battery with this restraining jig mounted to the charging device, wherein the restraining jig is configured to be removable from the charging device with the secondary battery arranged to the restraining jig regardless of the magnitude of the internal pressure in the secondary battery.

The charging device for the secondary battery according to the present invention is configured such that, after the charging is performed to the secondary battery, the restraining jig can be removed from the charging device with the secondary battery arranged thereto, regardless of the magnitude of the internal pressure in the secondary battery. Accordingly, the secondary battery can be removed from the charging device at any time as is left arranged to the restraining jig after the completion of the charging process.

Consequently, by performing the charging (e.g., initial charging) to the secondary battery with the use of the charging device of the present invention, the secondary battery can be removed from the charging device as is left arranged to the restraining jig without waiting for the reduction in the internal pressure in the secondary battery, for example, whereby the processing time taken for the charging process can be shortened. Moreover, the charging can be performed to another (new) secondary battery immediately after the charging process is completed, whereby the charging (charging process) of the secondary battery can swiftly be performed to thereby enhance productivity of the secondary battery.

Further, it is preferable that the above-mentioned charging device is configured such that the restraining jig can be attached to or removed from the charging device with the secondary battery arranged to the restraining jig.

A series of charging process such as mounting the secondary battery to the charging device, performing the process, and removing the secondary battery from the charging device can be carried out with the secondary battery arranged to the restraining jig, with the result that the charging (charging process) for the secondary battery can swiftly be performed.

Furthermore, in the above mentioned charging device for a secondary battery, preferably, the restraining jig is configured to be capable of being attached to or removed from the charging/discharging device with the secondary battery arranged thereto regardless of the magnitude of the internal pressure in the secondary battery.

The charging device for the secondary battery according to the present invention is configured such that the restraining jig is removable from the charging device with the secondary battery arranged thereto, regardless of the magnitude of the internal pressure in the secondary battery. Further, this restraining jig is configured to be attached to or removed from the charging/discharging device with the secondary battery arranged thereto, regardless of the magnitude of the internal pressure in the secondary battery.

Accordingly, in the charging device of the present invention, the charging can be performed to the secondary battery with the use of the restraining jig common to the charging/discharging device, thereby being capable of reducing cost for a manufacturing facility of the secondary battery, compared to the case of using a restraining jig dedicated for each device. Moreover, the restraining jig can be mounted to the charging/discharging device with the secondary battery arranged thereto for performing the charging/discharging to the secondary battery after the completion of the charging, resulting in that the charging/discharging can swiftly be performed.

BRIEF DESCRIPTION OF THE DRAWINGS

FIG. 3 is a sectional view of the secondary battery taken along a line A-A in FIG. 2;

FIG. 4A is a top view of a restraining jig in the preferred embodiment;

FIG. 4B is a side view of the restraining jig;

FIG. 6 is a top view of a charging device in the preferred embodiment (including the restraining jig with the secondary battery fixed thereto);

FIG. 11 is a view of the charging/discharging device in charging the secondary battery.

DESCRIPTION OF THE PREFERRED EMBODIMENT

A detailed description of a preferred embodiment of the present invention will now be given referring to the accompanying drawings.

Figure 1:
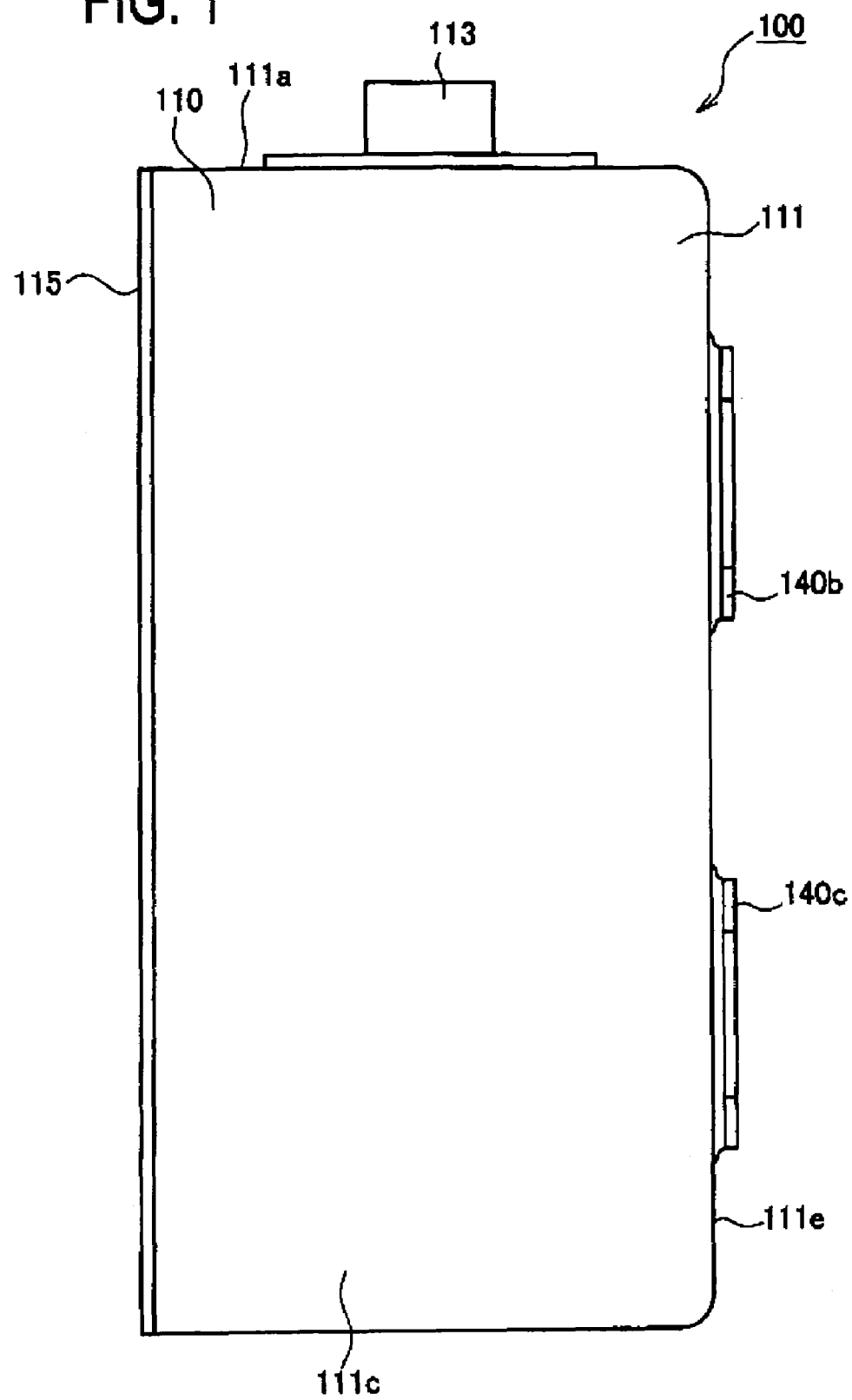
FIG. 1 is a front view of a secondary battery in a preferred embodiment.
Figure 2:
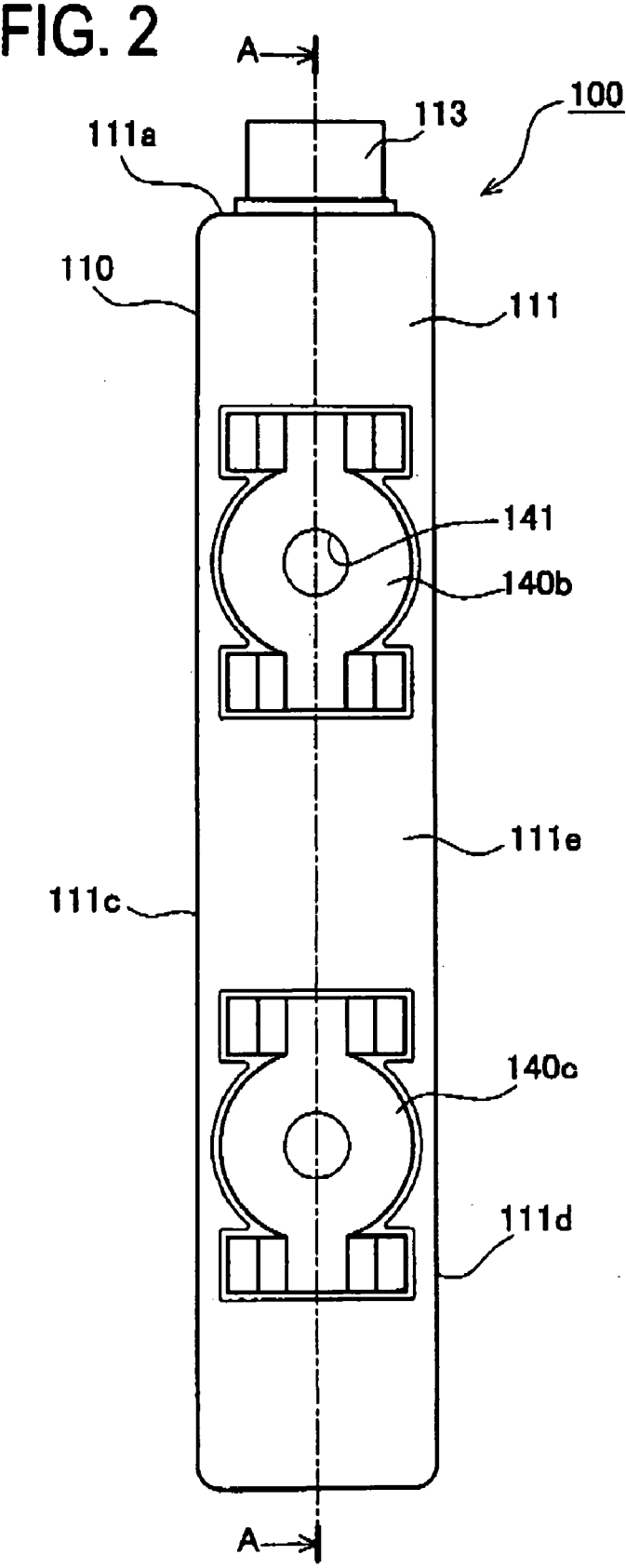
FIG. 2 is a side view of the secondary battery.

FIG. 1 is a front view of a secondary battery 100 according to the embodiment, FIG. 2 is a side view thereof, and FIG. 3 is a sectional view thereof (corresponding to the sectional view taken along a line A-A in FIG. 2).

The secondary battery 100 according to this embodiment is a rectangular closed nickel hydride storage battery provided with a metallic (specifically, nickel plating steel plate) battery case 110, a safety valve device 113, and a pole plate group 120 (see FIG. 3) and electrolytic solution (not shown) arranged in the battery case 110. In this embodiment, the pole plate group 120 and electrolytic solution correspond to a power generating element.

The pole plate group 120 is configured such that, as shown in FIG. 3, plural positive plates 121 having positive electrode active material layer 121s and plural negative plates 123 having negative electrode active material layer 123s are alternately laminated so that a separator 125 is located between adjacent two of the positive plates 121 and the negative plates 123. A negative electrode lead portion 123r of the negative plates 123 where the negative electrode active material layer 123s is not formed extends toward a predetermined direction (in the leftward direction in FIG. 3). On the other hand, a positive electrode lead portion 121r of the positive plates 121 where the positive electrode active material layer 121s is not formed extends toward the direction opposite to the negative electrode lead portion 123r (in the rightward direction in FIG. 3).

A usable electrode plate for the positive plates 121 includes, for example, the one in which an active material (constituting the positive electrode active material layer 121s) containing nickel hydroxide is carried on an active material base comprised of a nickel foam. Further, a usable electrode plate for the negative plates 123 includes, for example, the one in which an active material (constituting the negative electrode active material layer 123s) containing hydrogen storing alloy or the like is carried on an electrode base. A non-woven fabric made of a synthetic fiber that is subject to a hydrophilic process can be used as the separator 125, for example. Aqueous alkaline solution having KOH as a major component with a specific gravity of 1.2 to 1.4 can be used as the electrolytic solution, for example.

As shown in FIG. 3, the battery case 110 has a battery box 111 made of a metal (specifically, nickel plating steel plate) and having a rectangular box shape, and a cover member 115 made of a metal (specifically, nickel plating steel plate) and having a rectangular and generally plate-like shape. Two through-holes 111h are formed at a third side wall portion 111e of the battery box 111. A first positive terminal 140b and a second positive terminal 140c are inserted into these two through-holes 111h with an electrically insulating seal member 145 being mounted between the third side wall portion 111e and each of the first and second positive terminals 140b and 140c. The cover member 115 is circumferentially welded as being brought into contact with an opening end face 111f (see FIG. 3) of the battery box 111, thereby sealing an opening section 111g of the battery box 111. Thus, the cover member 115 and the battery box 111 are integrated to form the battery case 110.

As shown in FIG. 3, the negative electrode lead portion 123r of each of the negative plates 123 is bonded to the inner side face 115b of the cover member 115 by electron beam welding. According to this, the whole battery case 110 including the cover member 115 is made negative in the secondary battery 100 of this embodiment. Further, the positive electrode lead portion 121r of each of the positive plates 121 is bonded to the inner side face 130b of the positive electrode collecting plate 130 by an electron beam welding. Moreover, the positive electrode collecting plate 130 is bonded to the first positive electrode terminal 140b and the second positive electrode terminal 140c by a laser welding. Accordingly, the positive plate 121 is electrically connected to the first positive electrode terminal 140b and the second positive electrode terminal 140c.

Subsequently, a method for manufacturing the secondary battery 100 of this embodiment will be explained hereinafter.

[Assembling Process]

Firstly, the positive plates 121 and the negative plates 123 are laminated with the separator 125 interposed therebetween, forming the pole plate group 120. Then, the negative electrode lead portion 123r of each of the negative plate 123 of the pole plate group 120 is bonded to the inner side face 115b of the cover member 115 by the electron beam welding. Further, the positive electrode lead portion 121r of each of the positive plates 121 is bonded to the inner side face 130b of the positive electrode collecting plate 130 by the electron beam welding.

Independently, the first positive electrode terminal 140b and the second positive electrode terminal 140c are fixed to the battery box 111. Specifically, the seal member 145 is provided to the through-hole 111h of the battery box 111 and the columnar parts 141 of the first positive electrode terminal 140b and the second positive electrode terminal 140c are inserted from the outside. Subsequently, fluid pressure is applied to the inside of the cylinder of the columnar part 141 to expand one end of the columnar part 141 toward the outside in the diameter direction, and further, the same part is compressed to be deformed in the shaft direction, thereby forming a compression deformed part 141h. With this configuration, the first positive electrode terminal 140b and the second positive electrode terminal 140c are fixed to the battery box 111 as electrically insulated from the battery box 111.

Subsequently, in a bonded member having the pole plate group 120, cover member 115 and positive electrode collecting plate 130 bonded to one another, the positive electrode collecting plate 130 and the pole plate group 120 are inserted into the battery box 111 from the opening section 111g, and the battery box 111 is covered by the cover member 115. Then, laser is irradiated from the outside to bond the cover member 115 and the battery box 111, thereby sealing the battery box 111. Next, laser is irradiated to the recess of the columnar part 141 from the outside of the first positive electrode terminal 140b and the second positive electrode terminal 140c, thereby bonding the compression deformed part 141h of the columnar part 141 and the positive electrode collecting plate 130. Then, the electrolytic solution is injected from an injection port 111k positioned at the ceiling 111a of the battery box 111, and then, a safety valve 113 is attached so as to close the injection port 111k.

[Battery Arranging Process]

Figure 5A:
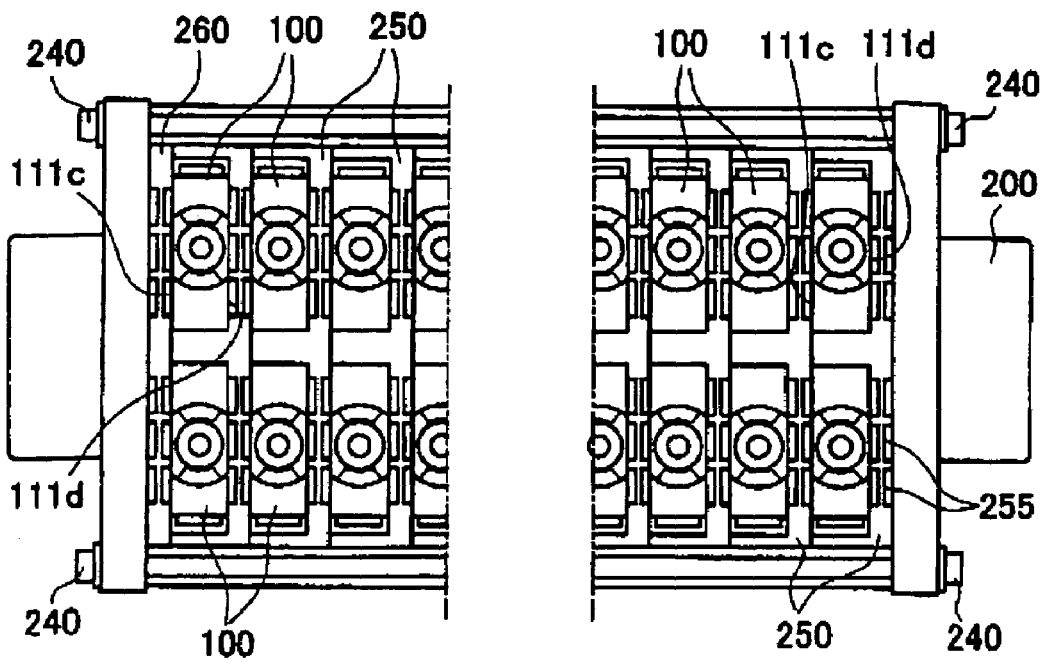
FIG. 5A is a top view of the restraining jig with the secondary battery fixed thereto.
Figure 5B:
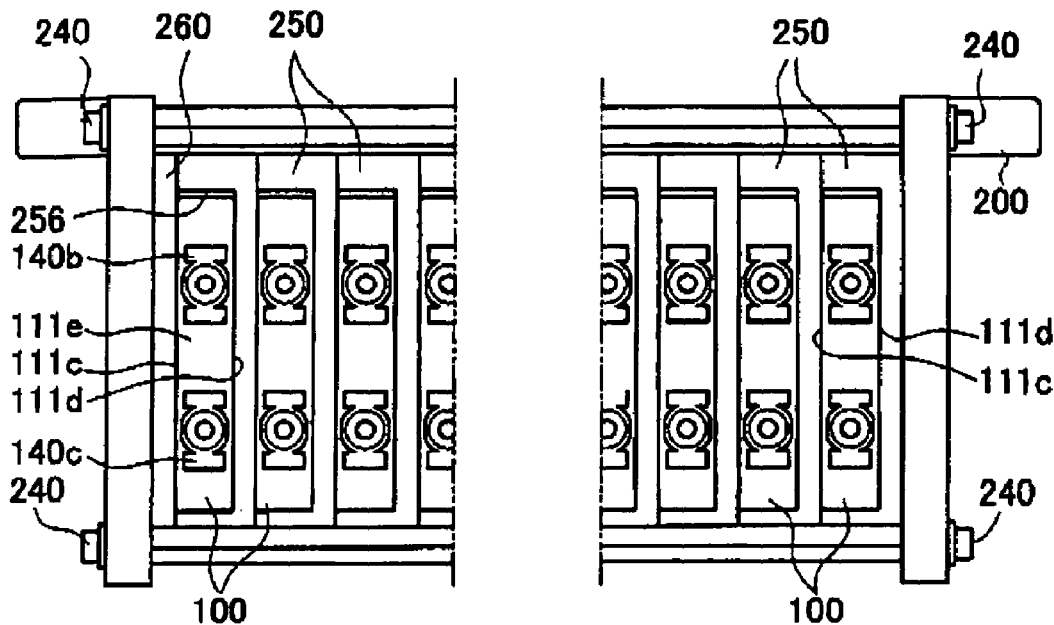
FIG. 5B is a side view of the restraining jig with the secondary battery fixed thereto.

Subsequently, plural secondary batteries 100 thus configured are arranged to a restraining jig 200 and fixed thereto as shown in FIGS. 5A and 5B.

As broadly embodied in FIG. 4, the restraining jig 200 has side plates 210 and 220 having generally a rectangular plate-like shape, four connecting rods 230 having a hexagonal section, eight fastening bolts 240, and plural expansion restricting members 250 and 260 positioned between both side plates 210 and 220. The side plates 210 and 220 are coupled with each other at its corner section by four connecting rods 230 fixed by the fastening bolts 240.

The expansion restricting member 250 is made of an electrically insulating resin. It has a side wall portion 251 having generally a reverse E-shape seen from the top and extending in the direction orthogonal to the sheet of the figure, and a rectangular bottom section 252. The expansion restricting member 260 is made of an electrically insulating resin, and has a shape of generally a plane plate as shown in FIGS. 4A and 4B. In this embodiment, the expansion restricting member 260 and fifty expansion restricting members 250 are arranged in a line so as to be spaced between the side plates 210 and 220. With this configuration, one hundred battery accommodating sections S are formed in the restraining jig 200 of this embodiment.

Further, a through-hole 254 extending in the direction of the arrangement of the expansion restricting members 250 (in the side-to-side direction in FIGS. 4A and 4B) is formed at each expansion restricting member 250. Accordingly, when the expansion restricting members 250 are arranged at the predetermined positions, the respective through-holes 254 of the expansion restricting members 250 are arranged in a line on the same axis as shown in FIG. 4B. The expansion restricting member 260 is also provided with a through-hole 264 that is arranged on the same axis of the through-holes 254 when it is arranged at the predetermined position. Further, the side plates 210 and 220 are also provided with through-holes 214 and 224 that are arranged on the same axis of the through-holes 254 of the expansion restricting members 250 arranged at the predetermined position.

In the restraining jig 200, one insertion rod 272 is inserted through the through-hole 214 of the side plate 210, through-hole 264 of the expansion restricting member 260, through-holes 254 of the expansion restricting members 250 and through-hole 224 of the side plate 220, those of which are arranged on the same axis, and this insertion rod 272 is fixed to the side plates 210 and 220. Accordingly, the expansion restricting member 260 and fifty expansion restricting members 250 are fixed so as to be movable in the direction in which the insertion rod 272 extends (in the side-to-side direction in FIG. 4A) between the side plates 210 and 220.

In the battery arranging process in this embodiment, one hundred secondary batteries 100 are firstly inserted and arranged at the battery accommodating sections S (see FIG. 4) of the restraining jig 200. Then, the fastening bolts 240 are fastened to compress the space between the side plates 210 and 220, whereby the first side wall portion 111c and the second side wall portion 111d of the secondary battery 100 are brought into intimate contact with the expansion restricting members 260 and 250. With this configuration, one hundred secondary batteries 100 can be fixed to the restraining jig 200 as electrically insulated from each other.

In general, when the secondary battery is charged, the internal pressure rises, so that it is likely to be expanded. In particular, the first side wall portion 111c and the second side wall portion 111d of the battery case 111 that have the greatest outer surface area are most likely to be expanded in the secondary battery 100 of this embodiment. As a countermeasure of this, one hundred secondary batteries 100 are arranged and fixed to the restraining jig 200 as described above in this embodiment, whereby the expansion of each of the secondary batteries 100 (battery cases 110) can be restricted with respect to the first side wall portion 111c and the second side wall portion 111d that are most likely to be expanded. Therefore, the expansion of the secondary battery 100 (battery case 110) can appropriately be restrained in the charging/discharging process as described later.

Figure 8:
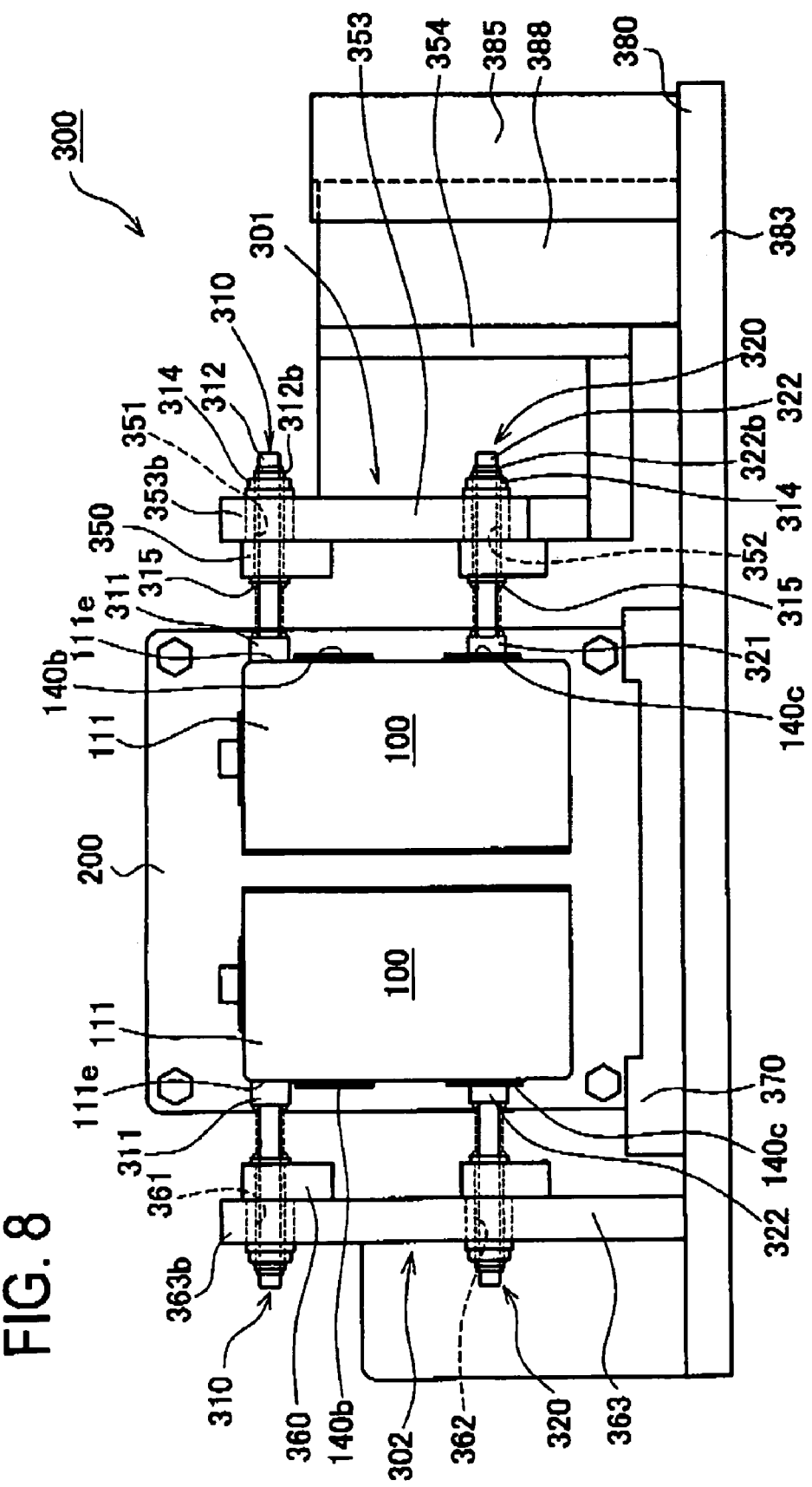
FIG. 8 is view of the charging device in a state of an initial charging process.

The expansion restricting member 250 of the restraining jig 200 has formed at both sides an opening section 256 as shown in FIG. 4B. Thus, when the secondary battery 100 is inserted and arranged in the battery accommodating section S (see FIG. 4) of the restraining jig 200, the third side wall portion 111e of the battery case 111, and the first and second positive electrode terminals 140b and 140c can be exposed to the outside from the opening section 256 as shown in FIG. 5B. Therefore, a negative electrode terminal 310 and a positive electrode terminal 320 of a charging device 300 can easily be connected to the third side wall section 111e and the second positive electrode terminal 140c of the battery case 111 from the side of the secondary battery 100 as shown in FIG. 8 in the initial charging process described later. Similarly, as shown in FIG. 11, negative electrode terminals 310 and 410 and positive electrode terminals 320 and 420 of a charging/discharging device 400 can easily be connected to the third side wall portion 111e and the first and second positive electrode terminals 140b and 140c of the battery case 111 from the side of the secondary battery 100 in the charging/discharging process described later.

[Initial Charging Process]

Figure 7:
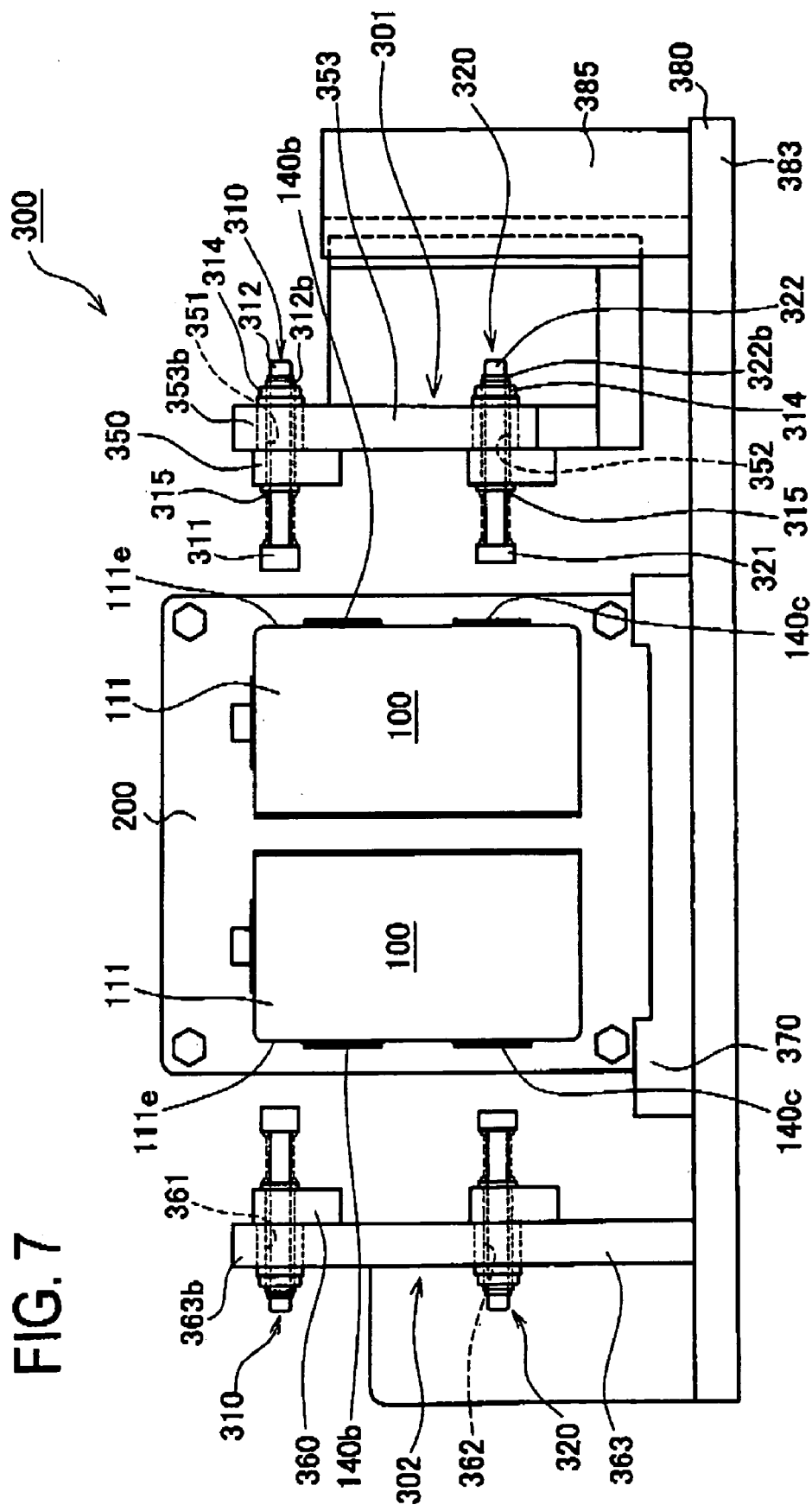
FIG. 7 is a view of the charging device (including the restraining jig with the secondary battery fixed thereto), taken in a direction of arrow B of FIG. 6.

Subsequently, the restraining jig 200 to which the secondary batteries 100 are arranged is mounted to the charging device 300 for performing an initial charging to the secondary batteries 100 as shown in FIGS. 6 to 8.

The charging device 300 according to this embodiment will be explained with reference to FIGS. 6 and 7. FIG. 6 is a top view of the charging device 300, and FIG. 7 is a view seen from an arrow B. It should be noted that rail members 381 and 382 are omitted in FIG. 7.

As shown in FIGS. 6 and 7, the charging device 300 has a frame 380, a first terminal unit 301, a second terminal unit 302, a restraining jig placing member 370, and a power supply unit not shown. The frame 380 has a main body 383 having a generally rectangular long-plate shape, rail members 381 and 382 fixed to both end sections of the main body 383 in the longitudinal direction (in the side-to-side direction in FIG. 6), and a column member 385 provided upright to the main body 383 between the rail members 381 and 382.

Further, the first terminal unit 301 has, as shown in FIG. 7, a first terminal holding member 350, negative electrode terminals 310 and positive electrode terminals 320. The first terminal holding member 350 has, as shown in FIG. 6, a long narrow main body 353 extending from the rail member 381 to the rail member 382, and moving members 355 and 356 provided at both end sections in the longitudinal direction (in the side-to-side direction in FIG. 6). At the main body 353, plural through-holes 351 are formed in a line in the longitudinal direction (in the side-to-side direction in FIG. 6) of the main body 353 at the upper end section 353b. Further, plural through-holes 352 are formed in a line in the longitudinal direction (in the side-to-side direction in FIG. 6) of the main body 353 below the through-holes 351 (in the downward direction in FIG. 7). In this embodiment, fifty through-holes 351 and fifty through-holes 352 are formed. The moving members 355 and 356 are mounted to the rail members 381 and 382 respectively. Thus, the first terminal holding member 350 (first terminal unit 301) can be moved along the rail members 381 and 382.

The negative electrode terminal 310 has a generally cylindrical terminal main body 312 and a connecting section 311 having disc shape with a diameter greater than that of the terminal main body 312. This negative electrode terminal 310 is insertedly mounted to the first terminal holding member 350 such that the terminal main body 312 is inserted into the through-hole 351 of the first terminal holding member 350. A locking nut 314 is screwed to a screw section 312b formed at the base section of the terminal main body 312. Further, a coil spring 315 is arranged between the connecting section 311 and the first terminal holding member 350 through which the terminal main body 312 is inserted. With this configuration, the negative electrode terminal 310 is fixed to the first terminal holding member 350 as being elastically movable in the axial direction of the negative electrode terminal 310 (in the side-to-side direction in FIG. 7). The negative electrode terminal 310 is provided at the position opposite to the third side wall portion 111e (negative electrode) of the secondary battery 100 positioned at the right row in the figure, when the restraining jig 200 having the secondary batteries 100 arranged thereto is placed on the restraining jig placing member 370.

The positive electrode terminal 320 has a generally cylindrical terminal main body 322 and a connecting section 321 positioned at its leading end and having a disc shape with a diameter greater than that of the terminal main body 322. This positive electrode terminal 320 is mounted to the first terminal holding member 350 with the coil spring 315 and the locking nut 314 like the negative electrode terminal 310 such that the terminal main body 322 is inserted into the through-hole 352 of the first terminal holding member 350. With this configuration, the positive electrode terminal 320 is fixed to the first terminal holding member 350 as being elastically movable in the axial direction of the positive electrode terminal 320 (in the side-to-side direction in FIG. 7). The positive electrode terminal 320 is provided at the position opposite to the second positive electrode terminal 140c of the secondary battery 100 positioned at the right row in the figure, when the restraining jig 200 having the secondary batteries 100 arranged thereto is placed on the restraining jig placing member 370.

In this embodiment, fifty negative electrode terminals 310 and fifty positive electrode terminals 320 are provided at the first terminal holding member 350.

The second terminal unit 302 has, as shown in FIG. 7, a second terminal holding member 360, negative electrode terminals 310 and positive electrode terminals 320. As shown in FIG. 6, the second terminal holding member 360 has a long narrow shape, and is arranged so as to be parallel to the first terminal holding member 350 at the position between the rail members 381 and 382. The second terminal holding member 360 is fixed to the main body 383 of the frame 380, different from the first terminal holding member 350.

As shown in FIG. 7, plural through-holes 361 are formed in a line in the longitudinal direction (in the side-to-side direction in FIG. 6) of the second terminal holding member 360 at the upper end section 363b of the second terminal holding member 360. Further, plural through-holes 362 are formed in a line in the longitudinal direction (in the side-to-side direction in FIG. 6) of the second terminal holding member 360 below the through-holes 361 (in the downward direction in FIG. 7). In this embodiment, fifty through-holes 361 and fifty through-holes 362 are formed.

The negative electrode terminal 310 is mounted to the second terminal holding member 360 with the coil spring 315 and the locking nut 314, like the side of the first terminal holding member 350, such that the terminal main body 312 is inserted into the through-hole 361 of the second terminal holding member 360. With this configuration, the negative electrode terminal 310 is fixed to the second terminal holding member 360 as being elastically movable in the axial direction of the negative electrode terminal 310 (in the side-to-side direction in FIG. 7). As shown in FIG. 7, the negative electrode terminal 310 is provided at the position opposite to the third side wall portion 111e (negative electrode) of the secondary battery 100 positioned at the left row in the figure, when the restraining jig 200 having the secondary batteries 100 arranged thereto is placed on the restraining jig placing member 370.

The positive electrode terminal 320 is mounted to the second terminal holding member 360 with the coil spring 315 and the locking nut 314 like the negative electrode terminal 310 such that the terminal main body 322 is inserted into the through-hole 362 of the second terminal holding member 360. With this configuration, the positive electrode terminal 320 is fixed to the second terminal holding member 360 as being elastically movable in the axial direction of the positive electrode terminal 320 (in the side-to-side direction in FIG. 7). As shown in FIG. 7, the positive electrode terminal 320 is provided at the position opposite to the second positive electrode terminal 140c of the secondary battery 100 positioned at the left row in the figure, when the restraining jig 200 having the secondary batteries 100 arranged thereto is placed on the restraining jig placing member 370.

In this embodiment, fifty negative electrode terminals 310 and fifty positive electrode terminals 320 are provided at the second terminal holding member 360.

Although not shown, the positive electrode terminals 320 and the negative electrode terminals 310 of the first and second terminal units 301 and 302 are connected to the unillustrated power supply unit via a connecting cable.

The restraining jig placing member 370 has, as shown in FIG. 6, a long narrow shape extending from the rail member 381 to the rail member 382. It has a main body 373 on which the restraining jig 200 can be placed, and moving members 375 and 376 provided at its both end sections in the longitudinal direction (in the side-to-side direction in FIG. 6). The moving members 375 and 376 are attached to the rail members 381 and 382 respectively. According to this, the first terminal holding member 350 (first terminal unit 301) can be moved along the rail members 381 and 382. The restraining jig placing member 370 is disposed between the first terminal unit 301 and the second terminal unit 302.

Subsequently, the initial charging process of this embodiment will be explained in detail. Firstly, the restraining jig 200 having one hundred secondary batteries 100 arranged thereto is placed on the restraining jig placing member 370 of the charging device 300. Then, the restraining jig placing member 370 on which the restraining jig 200 is placed and the first terminal unit 301 are moved toward the second terminal unit 302 along the rail members 381 and 382. Next, as shown in FIG. 8, after the first terminal unit 301 and the restraining jig placing member 370 on which the restraining jig 200 is placed are moved at the predetermined position, the first terminal unit 301 is fixed to the predetermined position as a fixing member 388 is interposed between the column member 385 provided upright at the frame 380 and the contact section 354 of the first terminal unit 301.

Accordingly, as shown in FIG. 8, the connecting section 311 of each of fifty negative electrode terminals 310 positioned at the first terminal unit 301 is elastically pressed against the third side wall portion 111e (negative electrode) of each of fifty secondary batteries 100 positioned at the right row in the figure, thereby establishing a connection. With this, the connecting section 321 of each of fifty positive electrode terminals 320 positioned at the first terminal unit 301 is elastically pressed against the second positive electrode terminal 140c of each of fifty secondary batteries 100 positioned at the right row in the figure, thereby establishing a connection.

Further, the connecting section 311 of each of fifty negative electrode terminals 310 positioned at the second terminal unit 302 is elastically pressed against the third side wall portion 111e (negative electrode) of each of fifty secondary batteries 100 positioned at the left row in the figure, thereby establishing a connection. With this, the connecting section 321 of each of fifty positive electrode terminals 320 positioned at the second terminal unit 302 is elastically pressed against the second positive electrode terminal 140c of each of fifty secondary batteries 100 positioned at the left row in the figure, thereby establishing a connection.

Subsequently, the unillustrated power supply unit is used to charge each secondary battery 100 up to SOC (State Of Charge) 20 to 50% with current of 0.1 C. Further, it is charged up to SOC 100% with 0.5 C. It should be noted that 1 C=6.5 A, and SOC 100%=6.5 Ah in this embodiment.

Thereafter, the fixing member 388 is removed from the charging device 300 in the state shown in FIG. 8, and then, the first terminal unit 301 and the restraining jig placing member 370 on which the restraining jig 200 is placed are moved to the original position (the position shown in FIG. 7). Then, the restraining jig 200 is removed from the restraining jig placing member 370 with the secondary batteries 100 arranged thereto.

In the initial charging process according to this embodiment, the initial charging is performed with the secondary batteries 100 arranged and fixed to the restraining jig 200 (specifically, with the state in which the expansion of the battery case 110 is restricted at the first side wall portion 111c and the second side wall portion 111d that are most likely to be expanded) as described above. Therefore, the expansion of the battery case 111 in the initial charging can appropriately be restrained, thereby being capable of preventing the distortion of the battery case 110 and leakage of the electrolytic solution.

In addition, the negative electrode terminal 310 and the positive electrode terminal 320 of the charging device 300 are elastically pressed against the third side wall portion 111e (negative electrode) and the second positive electrode terminal 140c of the secondary battery 100 for establishing a connection. Therefore, poor connection between the negative electrode terminal 310 of the charging device 300 and the third side wall portion 111e (negative electrode) of the secondary battery 100 and between the positive electrode terminal 320 of the charging device 300 and the second positive electrode terminal 140c (positive electrode) of the secondary battery 100 can be prevented during the initial charging, so that the initial charging of the secondary battery 100 can appropriately be performed.

Further, in the initial charging process according to this embodiment, the restraining jig 200 to which the secondary batteries 100 are arranged can be removed from the restraining jig placing member 370 at any time after the completion of the initial charging, regardless of the magnitude of the internal pressure of the secondary battery 100. Accordingly, the restraining jig 200 can be removed from the charging device 300 (corresponding to the first processing device) with the secondary batteries 100 arranged to the restraining jig 200 after the completion of the initial charging without waiting for the reduction of the internal pressure in the secondary battery 100.

Therefore, the processing time for the initial charging can be shortened, compared to the technique for removing the secondary batteries from the charging device after the internal pressure in the secondary battery is reduced (after the secondary battery expanded is returned to an original shape) after the completion of the initial charging. Further, after the initial charging is completed (after the restraining jig 200 having the secondary batteries 100 arranged thereto is removed from the restraining jig placing member 370), the restraining jig 200 having another (new) secondary batteries 100 arranged thereto can immediately be placed on the restraining jig placing member 370 for carrying out the initial charging of the secondary batteries 100. Accordingly, the initial charging process can swiftly and efficiently be performed in this embodiment.

[Charging/Discharging Process]

Figure 9:
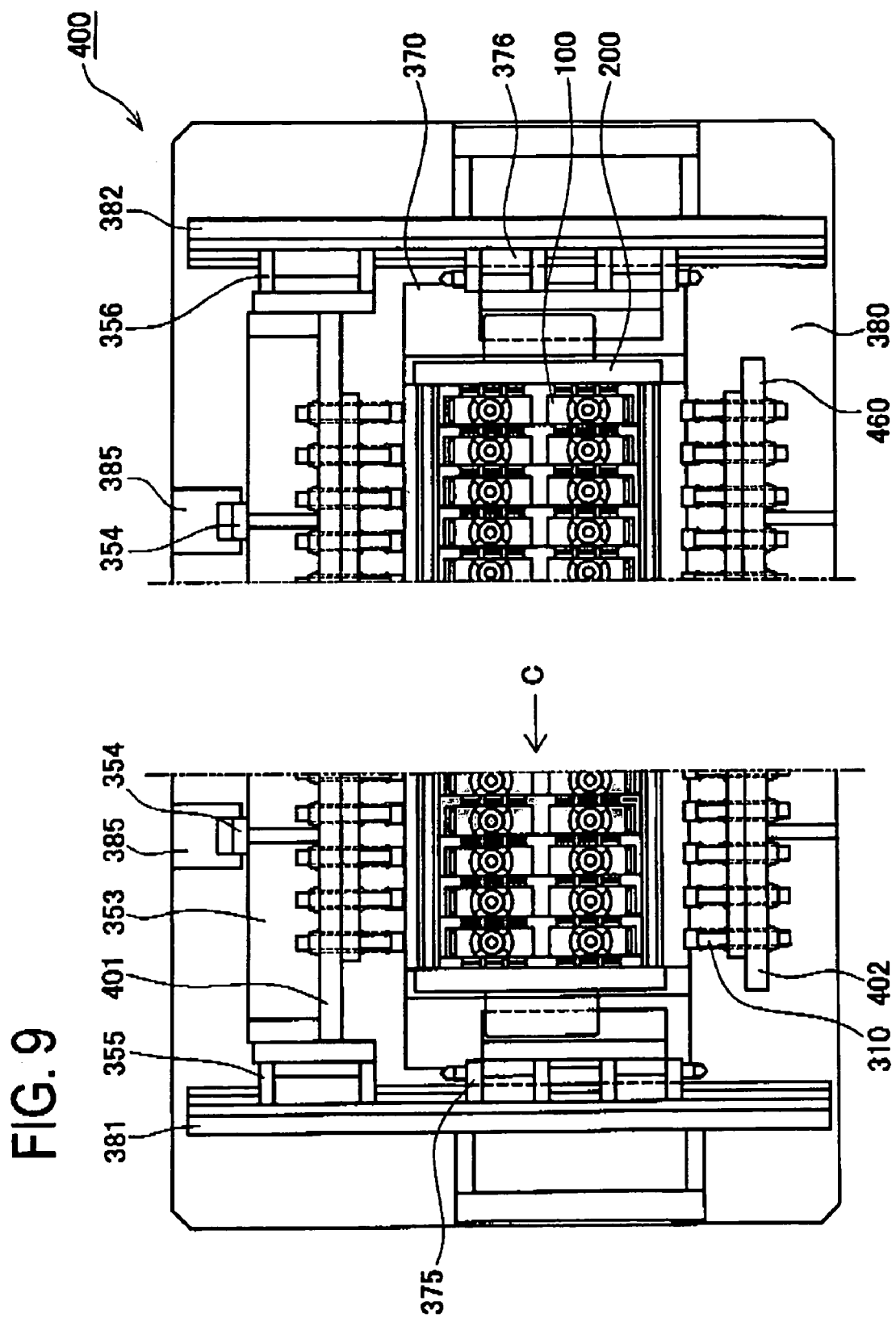
FIG. 9 is a top view of a charging/discharging device (including the restraining jig with the secondary battery fixed thereto) in the preferred embodiment.
Figure 10:
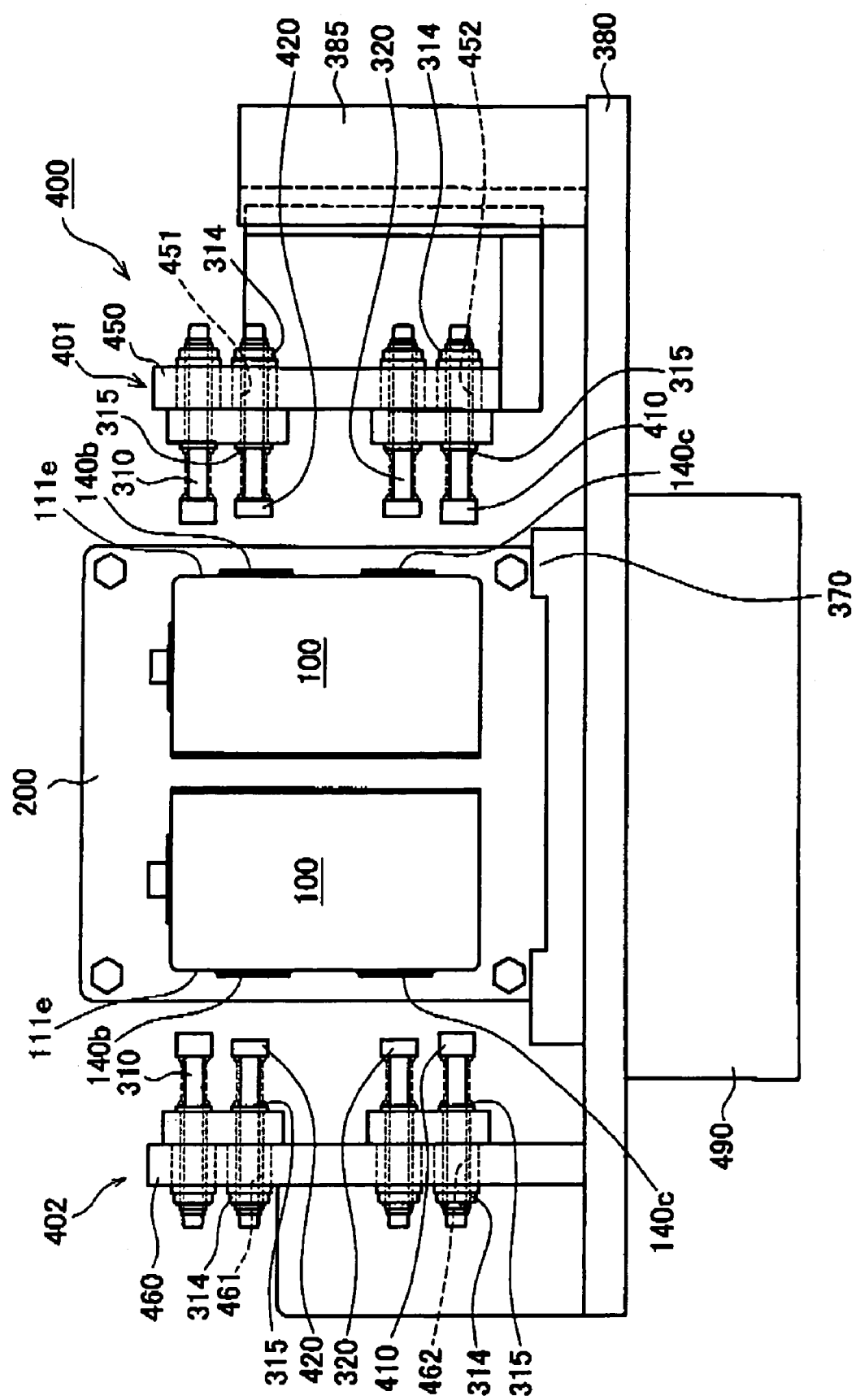
FIG. 10 is a view of the charging/discharging device (including the restraining jig with the secondary battery fixed thereto), taken in a direction of arrow C of FIG. 9.

Subsequently, the secondary batteries 100 are mounted to a charging/discharging device 400 with the secondary batteries 100 arranged to the restraining jig 200, after the completion of the initial charging, for performing charging/discharging to the secondary batteries 100 as shown in FIGS. 9 to 11. The charging/discharging device 400 according to this embodiment will be explained with reference to FIGS. 9 and 10. The charging/discharging device 400 in this embodiment is generally the same as the charging device 300 except that the first and second terminal units (specifically, the number of the positive electrode terminal and negative electrode terminal) and the unillustrated power supply unit are changed and a cooling unit 490 is added. Accordingly, the different points from the charging device 300 will be mainly explained, and the explanation is omitted or simplified with respect to the same parts.

The charging/discharging device 400 has, as shown in FIGS. 9 and 10, a frame 380 and a restraining jig placing member 370, that are similar to those of the charging device 300, and a first terminal unit 401, a second terminal unit 402 and an unillustrated power supply unit, that are different from those of the charging device 300, and the cooling unit 490.

The first terminal unit 401 is configured such that, as shown in FIG. 10, a positive electrode terminal 420 and a negative electrode terminal 410 are added to the first terminal unit 301 of the charging device 300. The positive electrode terminal 420 is equivalent to the positive electrode terminal 320. Fifty positive electrode terminals 420 in total are arranged in a line in the direction orthogonal to the sheet of the figure between the negative electrode terminals 310 and positive electrode terminals 320. The positive electrode terminal 420 is inserted into a through-hole 451 of a first terminal holding member 450 and mounted to the first terminal holding member 450 with the coil spring 315 and the locking nut 314 like the positive electrode terminal 320. With this configuration, the positive electrode terminal 420 is fixed to the first terminal holding member 450 as being elastically movable in the axial direction of the positive electrode terminal 420 (in the side-to-side direction in FIG. 10). The positive electrode terminal 420 is provided at the position opposite to the first positive electrode terminal 140b of the secondary battery 100 positioned at the right row in the figure, when the restraining jig 200 having the secondary batteries 100 arranged thereto is placed on the restraining jig placing member 370.

The negative electrode terminal 410 is equivalent to the negative electrode terminal 310. Fifty negative electrode terminals 410 in total are arranged in a line in the direction orthogonal to the sheet of the FIG. 10 below the positive electrode terminals 320. The negative electrode terminal 410 is also inserted into a through-hole 452 of the first terminal holding member 450 and mounted to the first terminal holding member 450 with the coil spring 315 and the locking nut 314 like the negative electrode terminal 310. Specifically, the negative electrode terminal 410 is also fixed to the first terminal holding member 450 as being elastically movable in the axial direction of the negative electrode terminal 410 (in the side-to-side direction in FIG. 10). The negative electrode terminal 410 is provided at the position opposite to the third side wall portion 111e (negative electrode) of the secondary battery 100 positioned at the right row in the figure, when the restraining jig 200 having the secondary batteries 100 arranged thereto is placed on the restraining jig placing member 370.

The second terminal unit 402 is configured such that, as shown in FIG. 10, a positive electrode terminal 420 and a negative electrode terminal 410 are added to the second terminal unit 302 of the charging device 300. Specifically, fifty positive electrode terminals 420 in total are mounted to a second terminal holding member 460 with the coil spring 315 and the locking nut 314 between the negative electrode terminals 310 and the positive electrode terminals 320, like the first terminal unit 401. More specifically, the positive electrode terminal 420 is provided at the position opposite to the first positive electrode terminal 140*b* of the secondary battery 100 positioned at the left row in the figure, when the restraining jig 200 having the secondary batteries 100 arranged thereto is placed on the restraining jig placing member 370.

Further, fifty negative electrode terminals 410 in total are mounted to the second terminal holding member 460 with the coil spring 315 and the locking nut 314 below the positive electrode terminals 320. Specifically, the negative electrode terminal 410 is provided at the position opposite to the third side wall portion 111*e* (negative electrode) of the secondary battery 100 positioned at the right row in the figure, when the restraining jig 200 having the secondary batteries 100 arranged thereto is placed on the restraining jig placing member 370.

The cooling unit 490 has an electric fan not shown. It is configured to send cooling air to the secondary batteries 100 arranged to the restraining jig 200 from the upward to the downward or from the downward to the upward in FIG. 10. The cooling unit 490 sends cooling air during the charging/discharging, so that the temperature rise of the secondary battery 100 involved with the charging/discharging can be restrained.

As shown in FIG. 4A, air ducts 255 and 265 passing in the direction orthogonal to the sheet of the figure are formed at the side wall portion 251 of the expansion restricting member 250 and the side wall portion 261 of the expansion restricting member 260 respectively of the restraining jig 200. Accordingly, as understood from FIG. 5A, the cooling air flowing from the upward to the downward (in the direction from the near side to the inner side in the figure) or from the downward to the upward (in the direction from the inner side to the near side in the figure) of the secondary battery 100 arranged to the restraining jig 200 can be made to flow through the air ducts 255 and 256, whereby the secondary battery 100 can suitably be cooled.

Although not shown, the positive electrode terminals 420 and the negative electrode terminals 410 of the first and second terminal units 401 and 402 are connected to the unillustrated power supply unit via a connecting cable.

Subsequently, the charging/discharging process according to this embodiment will be explained in detail. Firstly, the restraining jig 200 having one hundred secondary batteries 100 arranged thereto is removed from the charging device 300 (corresponding to the first processing device), and then, the restraining jig 200 having one hundred secondary batteries 100 arranged thereto is placed on the restraining jig placing member 370 of the charging/discharging device 400 as shown in FIGS. 9 and 10. Then, the restraining jig placing member 370 on which the restraining jig 200 is placed and the first terminal unit 401 are moved toward the second terminal unit 402 along the rail members 381 and 382. Next, as shown in FIG. 11, after the first terminal unit 401 and the restraining jig placing member 370 on which the restraining jig 200 is placed are moved at the predetermined position, the first terminal unit 401 is fixed to the predetermined position as a fixing member 388 is interposed between the column member 385 provided upright at the frame 380 and the contact section 354 of the first terminal unit 401.

Accordingly, as shown in FIG. 11, fifty negative electrode terminals 310 and fifty negative electrode terminals 410 mounted to the first terminal unit 401 are elastically pressed against the third side wall portion 111*e* (negative electrode) of each of fifty secondary batteries 100 positioned at the right row in the figure, thereby establishing a connection. With this, fifty positive electrode terminals 420 and fifty positive electrode terminals 320 mounted to the first terminal unit 401 are elastically pressed against the first and second positive electrode terminals 140*b* and 140*c* (positive electrode) of each of fifty secondary batteries 100 positioned at the right row in the figure, thereby establishing a connection.

Further, fifty negative electrode terminals 310 and fifty negative electrode terminals 410 mounted to the second terminal unit 402 are elastically pressed against the third side wall portion 111*e* (negative electrode) of each of fifty secondary batteries 100 positioned at the left row in the figure, thereby establishing a connection. With this, fifty positive electrode terminals 420 and fifty positive electrode terminals 320 mounted to the second terminal unit 402 are elastically pressed against the first and second positive electrode terminals 140*b* and 140*c* (positive electrode) of each of fifty secondary batteries 100 positioned at the left row in the figure, thereby establishing a connection.

Subsequently, the unillustrated power supply unit is used to repeatedly perform charging/discharging to the secondary battery 100. Specifically, the secondary battery 100 is charged up to SOC 100% with current of 2 to 5 C, and then, a charging/discharging cycle in which a discharging is carried out until the battery voltage becomes 1.0 V with current of 5 C is repeatedly performed several ten times. Then, the fixing member 388 is removed from the charging device 400 in the state shown in FIG. 11, and then, the first terminal unit 401 and the restraining jig placing member 370 on which the restraining jig 200 is placed are moved to the original position (the position shown in FIG. 10). Then, the restraining jig 200 is removed from the restraining jig placing member 370 with the secondary batteries 100 arranged thereto.

In the charging/discharging process according to this embodiment, the restraining jig 200 having arranged thereto the secondary batteries 100 is removed from the charging device 300, and then, the restraining jig 200 is mounted to the charging/discharging device 400 with the secondary batteries 100 arranged thereto, thereby performing the charging/discharging. Accordingly, compared to a technique for individually mounting the secondary battery, that is individually removed from the charging device, to the charging/discharging device, a labor for transferring the secondary battery is saved. Therefore, the secondary battery 100 can be swiftly mounted to the charging/discharging device 400 for performing the charging/discharging. Further, the restraining jig 200 used in the initial charging process is also used in the charging/discharging process, whereby cost can be reduced compared to the case of using a restraining jig dedicated for each process.

In the charging/discharging process according to this embodiment, the charging/discharging is performed with the secondary batteries 100 arranged and fixed to the restraining jig 200 (specifically, with the state in which the expansion of the battery case 110 is restricted at the first side wall portion 111*c* and the second side wall portion 111*d* that are most likely to be expanded) as described above. Therefore, the expansion of the battery case 111 in the charging/discharging can suitably be restrained, thereby being capable of preventing the distortion of the battery case 110 and leakage of the electrolytic solution.

In addition, the negative electrode terminals 310 and 410 and the positive electrode terminals 420 and 320 of the charging/discharging device 400 are elastically pressed against the third side wall portion 111e (negative electrode) and the first and second positive electrode terminals 140b and 140c of the secondary battery 100 respectively for establishing a connection. Therefore, poor connection between the negative electrode terminals 310 and 410 of the charging/discharging device 400 and the third side wall portion 111e (negative electrode) of the secondary battery 100 and between the positive electrode terminals 420 and 320 of the charging/discharging device 400 and the first and second positive electrode terminals 140b and 140c (positive electrode) of the secondary battery 100 can be prevented during the charging/discharging, so that the charging/discharging of the secondary battery 100 can suitably be performed.

Further, in the charging/discharging process according to this embodiment, the restraining jig 200 to which the secondary batteries 100 are arranged can be removed from the restraining jig placing member 370 at any time after the completion of the charging/discharging, regardless of the magnitude of the internal pressure of the secondary battery 100. Accordingly, the restraining jig 200 can be removed from the charging/discharging device 400 (corresponding to the second processing device) with the secondary batteries 100 arranged to the restraining jig 200 after the completion of the charging/discharging without waiting for the reduction of the internal pressure in the secondary battery 100.

Therefore, the processing time for the charging/discharging can be shortened, compared to the technique for removing the secondary batteries from the charging/discharging device after the internal pressure in the secondary battery is reduced (after the expansion of the secondary battery is stopped) after the completion of the charging/discharging. Further, after the charging/discharging is completed (after the restraining jig 200 having the secondary batteries 100 arranged thereto is removed from the restraining jig placing member 370), the restraining jig 200 having another (new) secondary batteries 100 arranged thereto can immediately be placed on the restraining jig placing member 370 for carrying out the charging/discharging of the secondary batteries 100. Accordingly, the charging/discharging process can swiftly and efficiently be performed in this embodiment.

[Aging Process]

Subsequently, an aging process is performed. The secondary battery that has already been subjected to the charging/discharging was placed in a thermal chamber that was kept to be generally constant temperature within 35 to 60° C. for 5 to 10 days. Specifically, the restraining jig 200 on which one hundred secondary batteries 100 were placed was removed from the charging/discharging device 400, and then, one hundred secondary batteries 100 arranged to the restraining jig 200 were put in a thermal chamber kept to be about 40° C. and rested for 5 to 10 days.

In general, the internal pressure of the battery rises even in the aging process in which the temperature of the secondary battery rises, so that there is a possibility of expansion of the battery case. As a countermeasure of this, the aging is performed during the aging process according to this embodiment with the secondary batteries 100 arranged and fixed to the restraining jig 200 (specifically, the expansion of the battery case 110 is restricted at the first side wall portion 111c and the second side wall portion 111d that are most likely to be expanded) as described above. Accordingly, the expansion of the battery case 111 can be suitably restrained even in the aging process, thereby being capable of preventing the distortion of the battery case 110 and the leakage of the electrolytic solution.

Further, the restraining jig 200 having one hundred secondary batteries 100 arranged thereto is removed from the charging/discharging device 400, and then, one hundred secondary batteries 100 are put in the thermal chamber as is left arranged to the restraining jig 200. As described above, it is unnecessary to remove the secondary batteries from the charging/discharging device and to transfer to an aging device, whereby the aging process can swiftly be performed. Moreover, the restraining jig 200 used in the initial charging process and the charging/discharging process is also used in the aging process, so that cost can be reduced compared to the case in which a jig dedicated for each process is used.

After the restraining jig 200 (see FIG. 5) having one hundred secondary batteries 100 arranged thereto is taken out from the thermal chamber, the secondary batteries 100 are removed from the restraining jig 200. Specifically, the fastening bolts 240 of the restraining jig 200 are released to widen the space between the side plates 210 and 220, whereby the first side wall portion 111c and second side wall portion 111d of the secondary battery 100 are separated from the expansion restricting members 250 and 260. Thereafter, one hundred secondary batteries 100 are removed from the battery accommodating sections S (see FIG. 4) of the restraining jig 200. Then, the secondary battery 100 shown in FIG. 1 is completed through a predetermined process.

The present invention may be embodied in other specific forms without departing from the spirit or essential characteristics thereof.

For instance, although the embodiment describes the manufacturing method of a nickel hydride storage battery (secondary battery 100), the initial charging process, charging/discharging process and aging process of the present invention can be applied not only to the nickel hydride storage battery but also to other secondary batteries (lithium ion battery, or the like). Specifically, the initial charging process, charging/discharging process and aging process are performed with the secondary batteries arranged to the restraining jig 200, resulting in that each process can swiftly be carried out, and hence, productivity of secondary battery can be enhanced.

Although the embodiment describes the manufacturing method of a rectangular secondary battery 100, the initial charging process, charging/discharging process and aging process of the present invention can be applied not only to the rectangular secondary battery but also to secondary batteries having other shapes (for example, cylindrical shape). It should be noted that the shapes of the expansion restricting members 250 and 260 of the restraining jig 200 are appropriately changed in accordance with the shape of the secondary battery. With this configuration, the expansion of the secondary battery can suitably be restrained in each process. Further, the initial charging process, charging/discharging process and aging process are performed with the secondary batteries arranged to the restraining jig, resulting in that each process can swiftly be carried out, and hence, productivity of secondary battery can be enhanced.

Although this embodiment describes the manufacturing method of the secondary battery 100 provided with the metallic battery case 110, the initial charging process, charging/discharging process and aging process of the present invention can be applied not only to the secondary battery provided with the metallic battery case but also to secondary batteries provided with a battery case made of other materials (for example, resinous battery case).

In the embodiment, the initial charging process, charging/discharging process and aging process are performed by using the restraining jig 200 in which fifty secondary batteries 100 can be arranged in two rows. However, any number of the secondary battery arranged to the restraining jig is possible. Further, any manner of arrangement of the secondary battery to the restraining jig is possible.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A manufacturing method of a secondary battery provided with a power generating element and a battery case accommodating the power generating element, comprising the steps of:

arranging the secondary battery to a restraining jig, said restraining jig comprising at least a pair of side plates adjacent respective sides of the secondary battery, and a removable connecting rod, configured to be tightened to compress the side plates against the respective sides of the secondary battery, thereby restricting an expansion of the battery case with respect to at least a part of the battery case, and that is configured to be removable from a processing device that performs at least one of a charging process and a discharging process on the secondary battery with the secondary battery arranged to the restraining jig regardless of a magnitude of an internal pressure in the secondary battery, and performing at least one of the charging process and the discharging process on the secondary battery with the restraining jig mounted to the processing device; and removing the restraining jig from the processing device with the secondary battery arranged thereto after the completion of said process.

2. A manufacturing method of a secondary battery provided with a power generating element and a battery case accommodating the power generating element, comprising the steps of:

arranging the secondary battery to a restraining jig, said restraining jig comprising at least a pair of side plates and a removable connecting rod, such that said side plates are adjacent respective sides of the secondary battery, said restraining jig configured to be removable from a charging/discharging device with the secondary battery arranged to the restraining jig regardless of the magnitude of the internal pressure in the secondary battery, and to perform the charging/discharging process to the secondary battery with the restraining jig mounted to the charging/discharging device;

tightening the restraining up side plates against the respective sides of the secondary battery, thereby restricting an expansion of the battery case during the charging/discharging process; and removing the restraining jig from the charging/discharging device with the secondary battery arranged thereto after completion of the charging/discharging process.

3. A manufacturing method of a secondary battery according to claim 2, further comprising:

an initial charging process for performing an initial charging to a non-charged secondary battery before the charging/discharging process, wherein the restraining jig is configured to be removable from the charging device with the secondary battery arranged thereto regardless of the magnitude of the internal pressure in the secondary battery, and during the initial charging process, the secondary battery is arranged to the restraining jig and the initial charging is performed to the secondary battery with the restraining jig mounted to the charging device, and the restraining jig is removed from the charging device with the secondary battery arranged thereto after the completion of the initial charging, and during the charging/discharging process, the restraining jig removed from the charging device is mounted to the charging/discharging device with the secondary battery arranged thereto for performing the charging/discharging process.

4. A manufacturing method of a secondary battery according to claim 2, further comprising:

an aging process wherein the secondary battery is rested under high-temperature atmosphere for a predetermined period after the charging/discharging process with the secondary battery arranged to the restraining jig.

5. A manufacturing method of a secondary battery according to claim 3, further comprising:

an aging process wherein the secondary battery is rested under high-temperature atmosphere for a predetermined period after the charging/discharging process with the secondary battery arranged to the restraining jig.

6. A manufacturing method of a secondary battery according to claim 2, wherein the charging/discharging device has a positive electrode terminal connected to the positive electrode of the secondary battery and a negative electrode terminal connected to the negative electrode of the secondary battery, wherein, in the charging/discharging process, the positive electrode terminal is pressed against the positive electrode of the secondary battery for establishing a connection while the negative electrode terminal is pressed against the negative electrode of the secondary battery for establishing a connection, and then the charging/discharging is performed.

7. A manufacturing method of a secondary battery according to claim 3, wherein the charging/discharging device has a positive electrode terminal connected to the positive electrode of the secondary battery and a negative electrode terminal connected to the negative electrode of the secondary battery, wherein, in the charging/discharging process, the negative electrode terminal is pressed against the negative electrode of the secondary battery for establishing a connection and the charging/discharging is performed, while the positive electrode terminal is pressed against the positive electrode of the secondary battery for establishing a connection.

8. A manufacturing method of a secondary battery according to claim 4, wherein the charging/discharging device has a positive electrode terminal connected to the positive electrode of the secondary battery and a negative electrode terminal connected to the negative electrode of the secondary battery, wherein, in the charging/discharging process, the negative electrode terminal is pressed against the negative electrode of the secondary battery for establishing a connection and the charging/discharging is performed, while the positive electrode terminal is pressed against the positive electrode of the secondary battery for establishing a connection.

9. A restraining jig that restricts an expansion caused on a battery case with respect to at least a part of the battery case with respect to a secondary battery provided with a power generating element and a battery case accommodating a power generating element, wherein the restraining jig comprises at least a pair of side plates adjacent respective sides of the secondary battery, and a removable connecting rod configured to be tightened to compress the side plates against the respective sides of the secondary battery, thereby restricting an expansion caused in the battery case during at least one of a charging process and a discharging process performed on the secondary battery, the restraining jig further being configured to be removable from a first processing device, that performs the at least one of the charging process and the discharging process on the secondary battery, with the secondary battery arranged to the restraining jig regardless of a magnitude of an internal pressure in the secondary battery.

10. A restraining jig according to claim 9, configured also to be removable from a second processing device, that performs at least either one of a charging process and discharging process to the secondary battery, with the secondary battery arranged to the restraining jig regardless of the magnitude of the internal pressure in the secondary battery.

11. A charging/discharging device that performs at least one of a charging process and a discharging process on a secondary battery provided with a power generating element and a battery case accommodating the power generating element, wherein the secondary battery is arranged to a restraining jig that restricts an expansion caused on a battery case with respect to at least a part of the battery case, and the at least one of the charging process and the discharging process is performed on the secondary battery with the restraining jig mounted to the charging/discharging device, wherein the restraining jig comprises at least a pair of side plates adjacent respective sides of the secondary battery, and a removable connecting rod configured to be tightened to compress the side plates against the respective sides of the secondary battery, thereby restricting an expansion caused in the battery case during the at least one of the charging process and the discharging process performed on the secondary battery, the restraining jig further being configured to be removable from the charging/discharging device with the secondary battery arranged to the restraining jig regardless of a magnitude of an internal pressure in the secondary battery.

12. A charging/discharging device for a secondary battery according to claim 11, comprising;

a positive electrode terminal to which a positive electrode of the secondary battery is connected under pressure; and a negative electrode terminal to which a negative electrode of the secondary battery is connected under pressure.

13. A charging/discharging device for a secondary battery according to claim 11, wherein the restraining jig is configured to be removable from the charging device with the secondary battery arranged thereto regardless of the magnitude of the internal pressure in the secondary battery; and the charging/discharging device is configured such that this restraining jig can be attached to or removed from the charging/discharging device regardless of the magnitude of the internal pressure in the secondary battery with the secondary battery arranged to the restraining jig.

14. A charging/discharging device for a secondary battery according to claim 12, wherein the restraining jig is configured to be removable from the charging device with the secondary battery arranged thereto regardless of the magnitude of the internal pressure in the secondary battery; and the charging/discharging device is configured such that this restraining jig can be attached to or removed from the charging/discharging device regardless of the magnitude of the internal pressure in the secondary battery with the secondary battery arranged to the restraining jig.

15. A charging device that performs a charging process on a secondary battery provided with a power generating element and a battery case accommodating the power generating element, wherein the secondary battery is arranged to a restraining jig that restricts an expansion caused on the battery case with respect to at least a part of the battery case, and the charging process is performed on the secondary battery with the restraining jig mounted to the charging device, wherein the restraining jig comprises at least a pair of side plates adjacent respective sides of the secondary battery, and a removable connecting rod configured to be tightened to compress the side plates against the respective sides of the secondary battery, thereby restricting an expansion caused in the battery case during at least one of a charging process and a discharging process performed on the battery, the restraining jig further being configured to be removable from the charging device with the secondary battery arranged to the restraining jig regardless of a magnitude of an internal pressure in the secondary battery.

16. A charging device for a secondary battery according to claim 15, wherein the restraining jig is configured to be capable of being attached to or removed from the charging/discharging device with the secondary battery arranged thereto regardless of the magnitude of the internal pressure in the secondary battery.

17. A manufacturing method of a secondary battery according to claim 1, wherein a plurality of secondary batteries are arranged in the restraining jig.

18. A manufacturing method of a secondary battery according to claim 17, wherein the restraining jig further comprises a plurality of spaced intermediate plates between respective ones of the plurality of secondary batteries.

19. A manufacturing method of a secondary battery according to claim 1, wherein removing the restraining jig comprises removing the connecting rod from the aligned apertures in the side plates.

* * * * *

UNITED STATES PATENT AND TRADEMARK OFFICE
CERTIFICATE OF CORRECTION

PATENT NO. : 7,586,288 B2
APPLICATION NO. : 11/371008
DATED : September 8, 2009
INVENTOR(S) : Masato Onishi, Yasufumi Tanaka and Kojiro Ito It is certified that error appears in the above-identified patent and that said Letters Patent is hereby corrected as shown below:

In claim 2, column 25, line 56, "up" should read --jig--.

Signed and Sealed this

Twenty-second Day of December, 2009

David J. Kappos
*Director of the United States Patent and Trademark Office*